United States Patent [19]
Satoh et al.

[11] Patent Number: 5,718,279
[45] Date of Patent: Feb. 17, 1998

[54] METHOD FOR LAMINATE FORMING A SAND MOULD AND A METHOD FOR PRODUCING A CASTING USING THE SAME

[75] Inventors: Hiromoto Satoh, Nagoya; Yukio Otsuka, Aichi-ken; Motoaki Ozaki, Okazaki; Masuo Shimizu, Mie-ken; Yuji Okada, Toyota; Yoshizumi Senda, Toyota; Soya Takagi, Toyota; Masaru Ogura, Toyota, all of Japan

[73] Assignee: Toyota Jidosha Kabushiki Kaisha, Aichi-ken, Japan

[21] Appl. No.: 739,728

[22] Filed: Nov. 7, 1996

[30] Foreign Application Priority Data

| Nov. 9, 1995 | [JP] | Japan | 7-290932 |
| Dec. 19, 1995 | [JP] | Japan | 7-330471 |
| May 17, 1996 | [JP] | Japan | 8-123787 |

[51] Int. Cl.[6] ................ B22D 13/00
[52] U.S. Cl. ........ 164/456; 164/15; 164/21; 264/219; 264/308
[58] Field of Search .......... 164/4.1, 15, 21, 164/456; 264/219, 308

[56] References Cited

U.S. PATENT DOCUMENTS

| 4,247,508 | 1/1981 | Housholder | 264/219 |
| 5,204,055 | 4/1993 | Sachs et al. | 419/2 |
| 5,354,414 | 10/1994 | Feygin | |
| 5,504,301 | 4/1996 | Eveland | |

FOREIGN PATENT DOCUMENTS

| 96 11 7352 | 3/1997 | European Pat. Off. |
| WO 92 16822 | 10/1992 | WIPO |

OTHER PUBLICATIONS

Communication dated Aug. 7, 1997.
European Search Report for EPO Appln No. 96–11 7352 dated Jul. 1, 1997.

Primary Examiner—Kuang Y. Lin
Attorney, Agent, or Firm—Finnegan, Henderson, Farabow, Garrett & Dunner, L.L.P.

[57] ABSTRACT

After sand of one layer is loaded into a sand layer elevator (20), a shading mask (38) is positioned above the sand, and a diffused laser beam is irradiated from a diffused laser irradiating source (16). Thereby, a predetermined range of sand under the shading mask (38) is exposed and this exposed portion is cured. This operation is repeated for a predetermined number of sand layers and cured portions are piled up to directly form a 3-D sand mould. Particularly, a diffused laser beam is used to cure a wide range of sand at a time, thereby making sand mould mass-production possible.

20 Claims, 31 Drawing Sheets

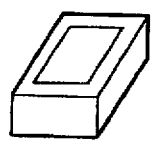 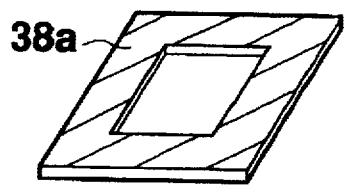
Fig. 4(A)  Fig. 4(B)
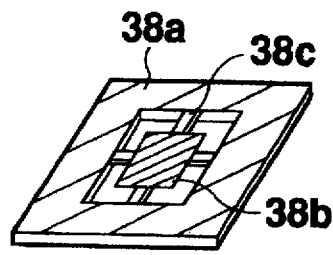 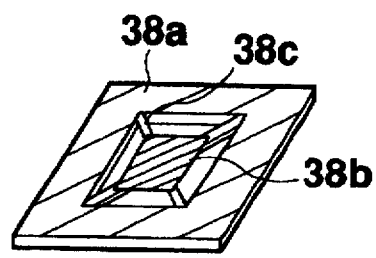
Fig. 4(C)  Fig. 4(D)
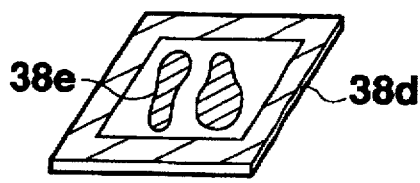
Fig. 5
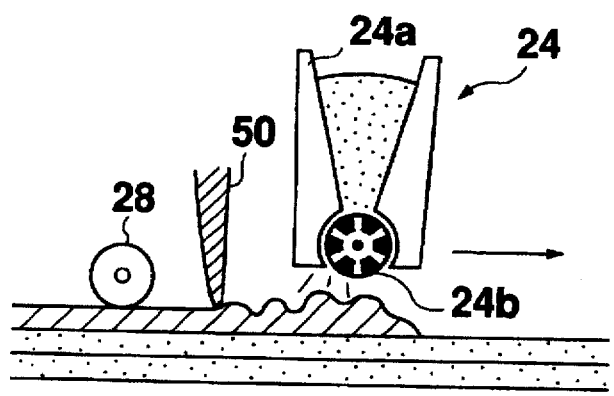
Fig. 6

|  | 0 | 2 SECONDS | 4 SECONDS |  |
|---|---|---|---|---|
| LASER EXPOSURE | #1 #2 #3 #4 #5 #6 | | | |
| SAND LAYER ELEVATOR | | #1~#6 | | |
| MASK MOVEMENT | | #1~#6 | | |
| SAND SPRINKLING | | | #1~#6 | |

Fig. 10

A PLURALITY OF SECTIONAL FORMS OF 3-D MASK FORM + SUPPORT FORMS
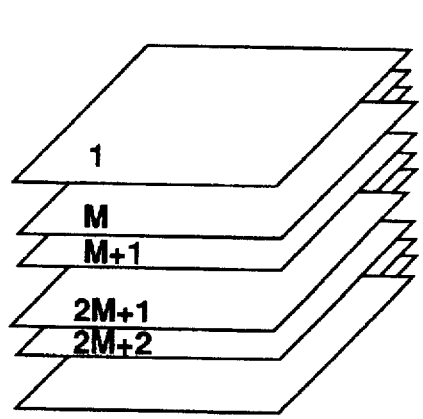
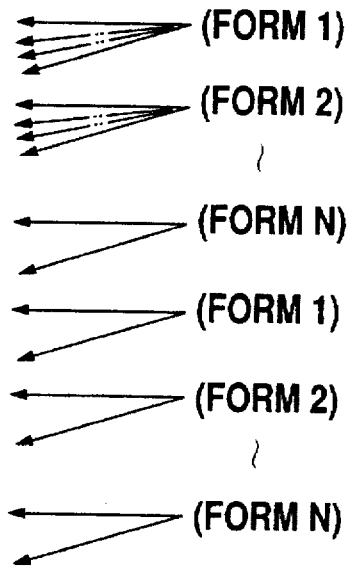
(2) REPEATING USE OF MASK A DESIGNATED NUMBER OF TIMES M
Fig. 31
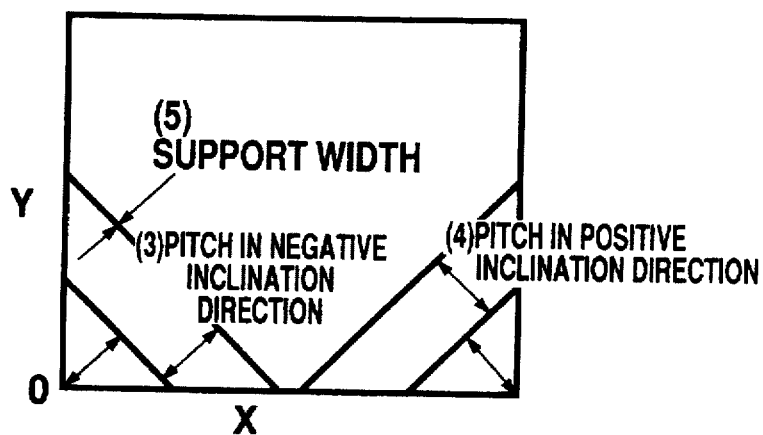
Fig. 32

METHOD FOR LAMINATE FORMING A SAND MOULD AND A METHOD FOR PRODUCING A CASTING USING THE SAME

BACKGROUND OF THE INVENTION

1. Field of the Invention

This invention relates to the formation of a sand mould as a three-dimensional sand shaped form by repeating steps of forming thin layers of sand coated with a thermosetting resin and curing the layers into predetermined shapes.

2. Description of the Related Art

Since a casting is formed by pouring a molten metal into a casting mould, the production of a casting begins with the fabrication of a reverse mould of the casting mould. Casting moulds are mainly divided into metal moulds and sand moulds (sand casting moulds) according to material. Though metal moulds have durability, they are expensive and frequently used to produces (mass-produce) a large quantity of the same product. On the other hand, sand moulds are used to produce a relatively small quantity of products, such as prototypes and products with a complex shapes or internal shapes. That is, as sand moulds are inexpensive, it is not necessary to take a casting directly from a sand mould because the sand mould is destroyed after casting and a product is removed. Castings having a complex shape can therefore be produced. In addition, a casting having an internal shape can be produced by using a mould for forming internal shapes, called "sand core".

Heretofore, to produce such a sand mould, a reverse mould thereof (made mainly of wood, a resin or a metal) has first been produced by NC (numerical control) machining or the like, and sand has been poured into the mould and set to form a sand mould. However, by this conventional sand mould forming method, draft must be taken into consideration in the step of designing a reverse mould of a sand mould. Since in particular the reverse mould of a sand mould must be divided into two, parting design for determining where the dividing surface (parting surface) should be set and draft design based on a pull direction for each divided piece must be carried out. Therefore, a great deal of time has been required to develop and design these moulds.

It is not desirable to spend a lot of time in prototype production. There is then proposed a rapid prototyping method for forming a prototype directly from 3-D CAD (Computer-Aided Design) date. Based on the idea that a 3-D object is a laminate of 2-D sectional forms having small thicknesses of 0.2 mm, this rapid prototyping is to form a 3-D object by forming and piling these sectional forms.

For instance, U.S. Pat. No. 4,247,508 discloses one of the prototyping methods making use of a laser. That is, a thin layer is formed from plastic particles which are thermally molten, a portion of the layer which is desired to be set is scanned by a laser beam, and the portion exposed to the laser beam is melted and solidified to form a 2-D structure. This operation is then repeated to form a 3-D object. By this method, a prototype can be directly formed.

This prior art also teaches that a reverse mould is directly formed and a sand shaped form is obtained by using plastic coated sand. There is also a description in the prior art which suggests the use of a mask during the scanning of a laser beam.

Since a shaped form is obtained directly by this method, it is not necessary to take into consideration the above-described parting, draft, and the like. Therefore, it is relatively easy to form sand moulds having various shapes from CAD data on shaped forms.

However, the above prior art is basically intended to form a prototype and does not take into consideration mass-production. Particularly, this art takes a great deal time to have a laser beam scan an entire portion to be set in the production of a single 2-D structure. Therefore, it is not realistic to produce a large number of sand moulds for mass-production using this prior art.

When a sand mould is formed by rapid prototyping, the sand mould no longer has any useless portion and unnecessary thickness and casting burr in a formed casting can be eliminated as it is not necessary to take into consideration parting and draft at the time of sand mould forming. Therefore, it is considered that the efficiency of the post-processing of a casting can be increased and the efficient mass-production of a casting can be effected using a sand mould if the sand mould can be efficiently formed.

If a laser beam is irradiated to cure shell sand in accordance with the above prior art, there is a problem in that the cured sand layer is warped. That is, since a sand layer for forming a sectional form generally has an extremely small thickness of 0.1 to 0.5 mm, the cured sectional form is in most cases warped as if a peripheral portion thereof were lifted upward due to the compression of a resin between sand grains.

If such a warp occurs, the next sand layer cannot be laminated or the sectional form of the next layer may be shifted or distorted. As a result, there is another problem that the forming accuracy of a sand mould deteriorates.

Further, in the above related art, in the production of a mask, an isolated island portion corresponding to a sand core is required for the mask. In this case, a support is needed to hold the island portion in the mask. This support cannot be obtained from the calculation of a 2-D sectional form by slicing the sectional form of a casting and must be designed separately. Then a designer judges the existence of an island portion and designs a support for the island portion in the prior art.

SUMMARY OF THE INVENTION

It is an object of the present invention to provide a method for laminate forming a sand mould suitable for mass-production.

It is another object of the present invention, which has been made to solve the above problems, to provide a method for forming a sand mould by lamination, which can prevent the occurrence of a warp-during the formation of a sectional form.

It is still another object of the present invention to provide a method for producing a mask, which can automatically design a support.

In the present invention, a diffused laser beam is irradiated onto a thin sand layer through a shading mask. Therefore, resin coated sand can be set at one time and the processing time of one layer can be greatly reduced. Consequently, a sand mould for mass-production can be produced efficiently. In addition, since a diffused laser beam is irradiated through a shading mask, a laser beam can be irradiated onto the sand under the shading mask with relatively uniform energy density. Therefore, the sectional and plane forms of the set shaped article can be made sharp. That is, when a fine converged laser beam is used, an exposed portion is shaped like a groove and its sectional and plane forms become unclear; this can be prevented by using a diffused laser beam.

When a core is formed, an isolated island is needed for the shading mask and supports for supporting this island are necessary. According to another aspect of the present invention, a small hole for the supports is produced in the formed sand mould by changing the positions of the supports in each layer. This hole can be made small so that a molten metal cannot enter. Since this hole functions as a gas vent hole at the time of casting, the formation of a core and the formation of a gas vent hole can be simultaneously accomplished.

According to another aspect of the present invention, sand is heated by a heat source above a heat insulating mask. This heat source can be very easily formed of a heater or the like. The heater is inexpensive and uniformly heats a wide range with ease. Therefore, a relatively large sand mould can be efficiently formed.

According to yet another aspect of the present invention, a heat source having a relatively large area which is divided into separate heat source elements are arranged above a heat insulating mask to heat an exposed portion of a sand layer. Since the heat source is divided in this way, only a predetermined range can be heated. Since each divided heat source element heats a small range, uniform heating can be effected.

According to still another aspect of the present invention, the above divided heat source elements are turned on and off independently to heat the divided blocks of the area of the sand layer. Therefore, the heat generation of the heat source elements for blocks not to be exposed can be prevented. Total energy saving can then be realized. Further, a heat insulating mask is less heated, thus extending the mask's service life.

According to a further aspect of the present invention, multiple stations are used. Thereby, a plurality of sand moulds can be formed using one set of masks. Thus, sand moulds can be effectively mass-produced.

According to a still further aspect of the present invention, a first layer in the process of forming sand layers is formed in such a manner that it is laminated on and adheres to the pedestal which is initially formed.

When resin coated sand is cured, the resin is in most cases compressed by this curing. The cured sand layer is warped by this compression. Therefore, the accuracy of the formed sand mould deteriorates.

According to this aspect of the present invention, the first sand layer is formed on the pedestal. Therefore, the first layer adheres to the pedestal. Warp of the sand layer can be prevented by the pedestal's strength. Since the first layer is not warped, warp of each layer formed thereon is prevented as well. Therefore, a high-accuracy sand mould without distortion can be formed.

According to a still further aspect of the present invention, two different types of sands having at least two peaks in grain size distribution and having different grain diameters are used to form a sand mould.

When sands having different grain diameters are used in this way, the sand having a small diameter enters the space between the sands having a larger grain diameter, thereby increasing the bulk density of the sand. When the bulk density of the sand increases, the generation of a warp caused by the compression of the resin is suppressed, thereby making it possible to form a high-accuracy sand mould without distortion.

According to a still further aspect of the present invention, in the above sand layer forming step, the sand having a relatively large grain diameter is sprinkled and then the sand having a relatively small grain diameter is sprinkled to form a single sand layer.

When different types of sands having different grain diameters are sprinkled at the same time, the sand having a small grain diameter accumulates in a lower portion of a sand layer, thus making it possible to increase the bulk density (particularly a top portion of the sand layer). After the sand having a large grain diameter is sprinkled, the sand having a small grain diameter is sprinkled, whereby the sand having a small grain diameter enters the space between the sands having a large grain diameter, thus effectively increasing the bulk density.

According to a still further aspect of the present invention, in the sand layer forming step, sand is vibrated by an oscillator to compress the sand and form a sand layer. By giving vibration to sand layers in this way, the bulk density of sand can be effectively increased.

According to a still further aspect of the present invention, in the sand layer forming step, sand is sprinkled to a thickness 1 to 10% larger than the thickness of a required sand layer and then compressed by a plate from above. In this way, the bulk density of sand can be increased effectively by the plate compression.

According to a still further aspect of the present invention, when an island portion is present in a mask form, a mask is manufactured by automatically arranging supports of parallel lines at predetermined intervals in the space surrounding the island portion. In the present invention, supports are arranged as parallel lines at predetermined intervals. Therefore, the arrangement of the supports can be easily automated. The interval of supports of parallel lines may be set at an interval which enables the supports to fully support the island portion. When supports are provided in parallel to the outlines of the island portion, they are combined into one if they contact each other. On the other hand, in most cases a normal island portion is expressed by an XY coordinate system and is parallel to X and Y axes. Then, the parallel lines are preferably in an oblique direction of 45° basically in the XY coordinates.

According to a still further aspect of the present invention, supports in the form of a lattice are arranged at predetermined intervals in the space surrounding the island portion. Since the supports are disposed in this lattice form, it is possible to automatically arrange them with ease. The strength of the supports can be made sufficient by arrangement at predetermined intervals.

According to a still further aspect of the present invention, there is provided a step of changing the position of an automatically arranged support according to the connection state between an island portion and the support.

In this way, after a support is automatically arranged, the position of the support is changed according to its connection state. For instance, an unnecessary support arranged within a frame form is removed, a support is added for an island which cannot be supported by supports at predetermined intervals, or the position of a support for supporting only an end portion of an island portion is changed. These processes are carried out automatically. Thereby, the optimized arrangement of supports in a mask form can be automated.

According to a still further aspect of the present invention, in the above automatic support arranging step, the locations of supports are made different between masks used for adjacent layers.

When the positions of supports in adjacent layers are the same, a space portion of a mould produced by the supports is continuous and a portion of a casting is formed in this space portion. A space in a mould generated by supports can be formed into a predetermined Shape by changing the positions of supports for adjacent layers, a molten metal is prevented from entering the space, and changes in the shape of a casting can be prevented.

According to a still further aspect of the present invention, in the above automatic support arranging step, the locations of supports are made different among masks used for at least adjacent layers.

For instance, when supports in the form of a lattice are used, if support patterns for only two layers are made different, a common portion is produced and forms a space for a casting. Support patterns for three adjacent layers are made different so that a common portion for two adjacent layers is not continued to a third layer, thus eliminating the above-described problem.

According to a still further aspect of the present invention, in the above automatic support arranging step, an island portion is judged by closed outlines and a support connecting the same outline is removed as unnecessary.

Thereby, an unnecessary support connecting the inside of a doughnut-shaped island portion can be removed.

According to a still further aspect of the present invention, in the above optimized changing step, the stability of an island portion is judged from the center position of the island portion and the connection position of a support with the island portion, the connection state of the support is changed according to this stability.

When only the end of an island portion is supported by a support, the island portion becomes unstable. The support is then changed to support the center of the island portion to make the mask stable.

According to a still further aspect of the present invention, there is provided the step of manufacturing a mask by machining sheet metal by a laser based on a mask form in which supports are arranged. By machining sheet metal, such as an iron sheet, by a laser to form a mask, a predetermined mask form can easily be realized.

A predetermined range of each sand layer is solidified by using the mask thus formed and this is repeated to from a sand mould. Further, the sand mould thus formed is used for a casting, thereby making it possible to easily manufacture a casting based on 3-D form data of a rough material.

Particularly, according to this method, all the data from 3-D data of a rough material to data for the formation of a casting can be collected and design can hence be changed with ease. Since a sand mould is formed by piling up sand layers, data to be handled for the formation of this sand mould is basically 2-D form data which can be processed easily. Further, it is not necessary to take into consideration draft and parking at the time of forming a sand mould, which is easy to manufacture.

Thus, according to the present invention, the formation of a mask, the formation of a sand mould and the production of a casting can be carried out efficiently.

The method for producing a casting according to the present invention is characterized in that a casting is produced using a sand mould formed by the above-described method sand mould.

As described above, since the mould thus obtained is directly formed, it has no draft and parting. Therefore, the design of a sand mould can easily be performed from CAD data on a product form. Further, the sand mould thus obtained is used to obtain a casting which is no thicker than necessary, post processing is easy, and effective use of a material is realized.

BRIEF DESCRIPTION OF THE DRAWINGS

These and other objects and advantages of the present invention will become clear from the following description with reference to the accompanying drawings, wherein:

FIG. 4(A), 4(B), 4(C) and 4(D) show examples of a shading mask;

FIG. 5 is a diagram showing an example of a shading mask for a YAG laser;

FIG. 6 is a diagram showing an example of a sand sprinkler;

FIG. 10 is a timing chart showing operation when multiple stations are used;

FIG. 31 is a diagram explaining a designated number of repetitions of masks M and a designated number of support patterns N;

FIG. 32 is a diagram explaining the pitch and width of a support;

DESCRIPTION OF THE EMBODIMENT

Preferred embodiments of the present invention are described hereinunder with reference to the accompanying drawings.

[First Embodiment]

[Constitution]

Figure 1:
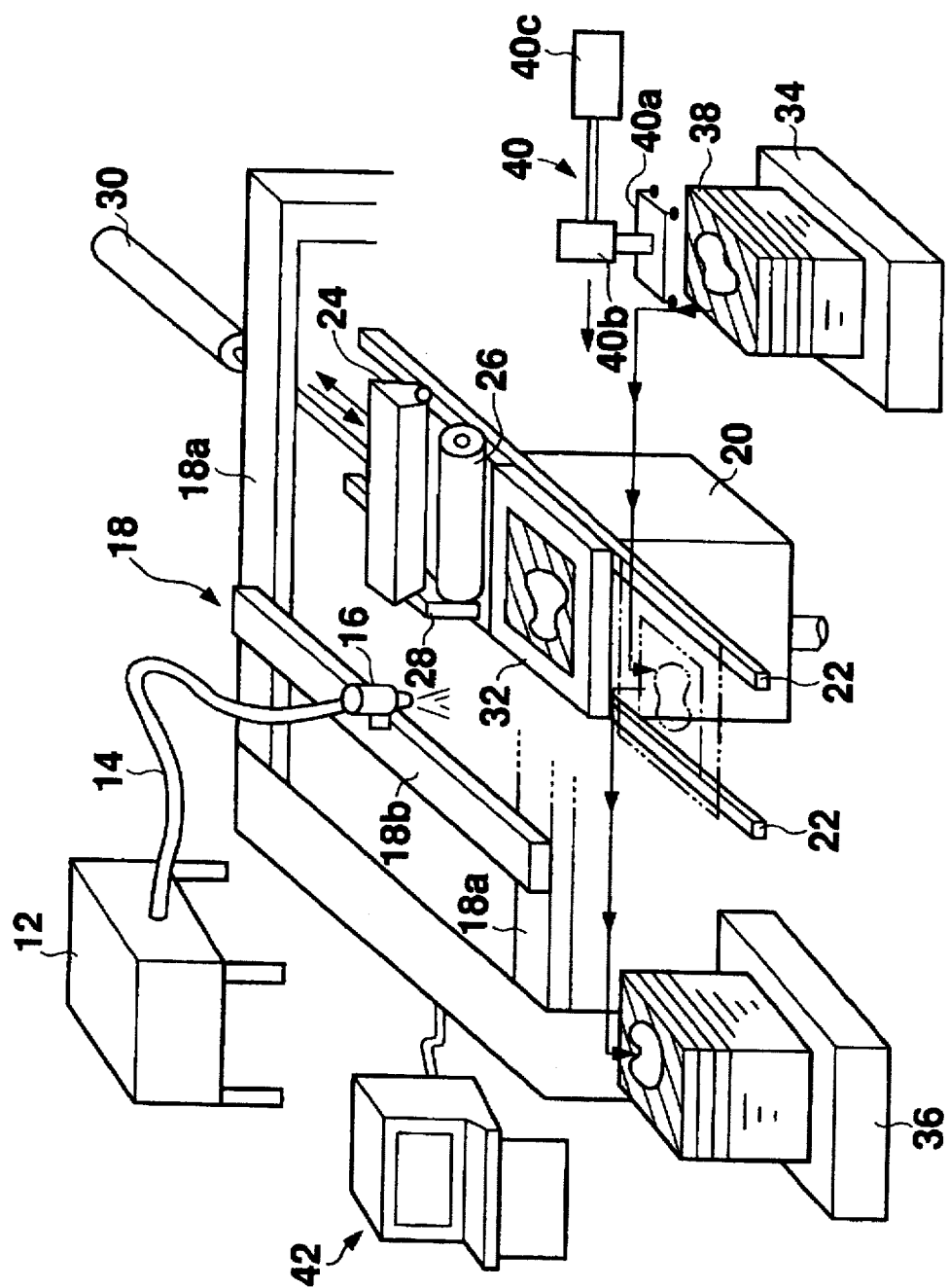
FIG. 1 is a diagram showing the entire configuration of a first embodiment of the present invention.
Figure 2:
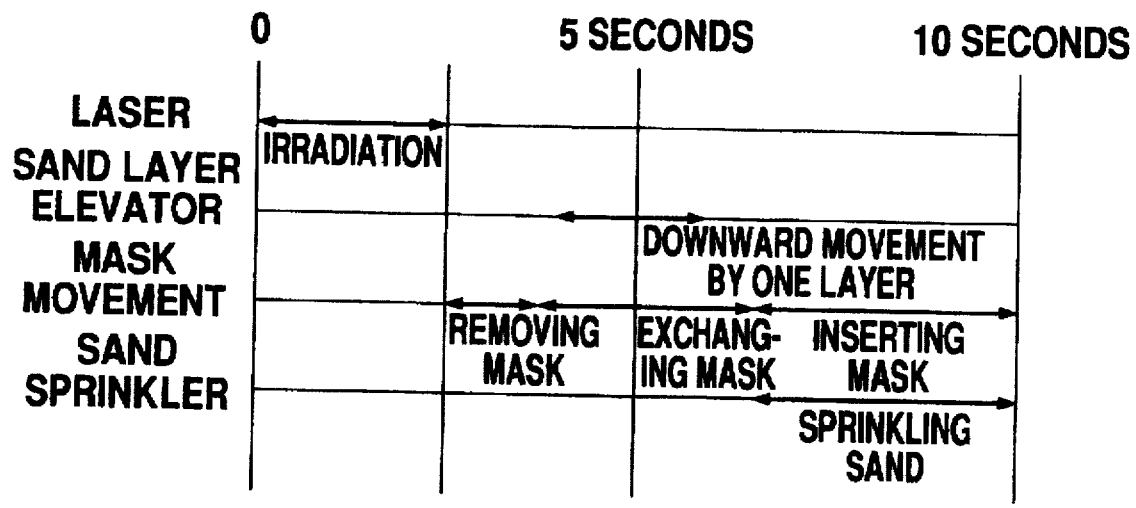
FIG. 2 is a timing chart showing the operation of the first embodiment.

FIG. 1 shows the entire configuration of a first embodiment of the present invention. A laser oscillator 12 generates a laser beam as a heat source and various laser oscillators such as carbon dioxide gas laser, YAG (yttrium-aluminum-garnet) laser and the like may be used. A laser beam from the laser oscillator 12 is supplied to a diffused laser irradiation source 16 through a flexible optical FIG. 14. The diffused laser irradiation source 16 has a predetermined lens therein, diffuses the supplied laser beam into a predetermined wide-range irradiation type diffused laser beam, and irradiates the diffused laser beam.

The diffused laser irradiating source 16 is held by an XY plotter 18. The XY plotter 18 has fixed X-axis rails 18a (a pair) and an Y-axis rail 18b travelling along the X-axis rails 18a, and the diffused laser irradiating source 16 moves along the Y-axis rail 18b, enabling it to move freely over the X-Y plane.

Below the X-Y plotter 18, there is provided a sand layer elevator 20. The sand layer elevator 20 has an open top and a bottom plate which can move vertically, and a receptacle for containing resin coated sand for producing a sand mould is formed on top of the bottom plate. Above the sand layer elevator 20, there are arranged a pair of rails 22 on which a sand sprinkler 24 and a sand roller 26 are movably mounted.

The sand sprinkler 24 is a hopper-like container having an opening in a bottom portion thereof and sprinkles the resin coated sand contained therein toward the receptacle of the sand layer elevator 20 below. The sand roller 26 is cylindrical and rolls while moving to flatten the surface of sand contained in the receptacle of the sand layer elevator 20.

The sand sprinkler 24 and the sand roller 26 are connected by a connecting material 28 and can move integrally along the rails 22 by a movable cylinder 30. In this example, the rails 22 extend in the Y axis direction and the sand sprinkler 24 and the sand roller 26 move back and forth in the Y axis direction by the movement of the movable cylinder 30. Further, before the connecting material 28, there is provided a detachable mask holding material 32 which can move along the rails 22.

The rails 22 are extended beyond the under side of the Y-axis rail 18b on this side in the diagram of the XY plotter 18, a mask support base 34 is arranged on the right side of extension portions thereof and a mask collection base 36 is arranged on the left side of the extension portions. Above these mask support base 34 and mask collection base 36, a mask transfer unit 40 for transferring a mask 38 from the mask support base 34 to the mask collection base 36 is disposed. This mask transfer unit 40 consists of a mask holding portion 40a for holding the mask 38, an elevating portion 40b for moving the mask holding portion 40a vertically, and a moving portion 40c for moving the elevating portion 40b in the X axis direction. The masks 38 piled up and held on the mask support base 34 can be mounted on the mask holding material 32 over the rails 22 and collected from the mask holding material 32 to the mask collection base 36 by the mask moving unit 40. The mask holding material 32 holds the mask 38, keeps the mask at a predetermined position and transmits a laser beam passing through the hole of the mask 38 downwards. The mask holding portion 40a is formed of an acetablum, electromagnet, or the like.

In other words, the mask holding portion 40a is moved down over the held mask 38 from above the mask support base 34 by the elevating portion 40b and then it holds the mask 38. After the mask holding portion 40a is moved up, the mask 38 is positioned above the mask holding material 32 on the extension portions of the rail 22 by the moving portion 40c. At this point, the mask 38 is moved down by the elevating portion 40b and the mask holding portion 40a releases the mask 38 above the mask holding material 32 which is in turn caused to hold the mask 38. With a similar operation, the mask 38 held by the mask holding material 32 over the rails 22 can be mounted on the mask collection base 36.

Further, a mechanism for holding the mask holding material 32 is provided at a front end portion of the connecting material 28 for connecting the sand sprinkler 24 and the sand roller over the rails 22. Therefore, this mechanism holds the mask holding material 32 when the connecting material 28 moves toward this side, pulls the mask together with the mask holding material 32 when it is moved backward and releases the mask holding material 32 when it moves toward this side, whereby the mask 38 can be moved along the rails 22 in the Y axis direction.

A controller 42 controls the operations of the laser oscillator 12, the XY plotter 18, the sand elevator 20, the movable cylinder 30, the mask moving unit 30 and the like.

[Operation]

The operation of this apparatus is described below. When a sand mould is manufactured using this apparatus, a large number of sectional forms are first obtained from CAD data on the sand mould and a plurality of masks 38 corresponding to the sectional forms are prepared. The sand sprinkler 24 contains resin coated sand coated with a plastic which is molten when exposed to a laser beam. A mask 38 is mounted on the mask holding material 32 on the extension portions of the rails 22 by the mask moving unit 40, the sand sprinkler 24 and the sand roller 26 are moved toward this side by the movable cylinder 30, and the mask holding material 32 which holds the mask 38 is held by the connecting material 28. Thereafter, the sand sprinkler 24, the sand roller 26 and the mask 38 are moved backward by the movable cylinder 30. At this point, the sand is sprinkled by the sand sprinkler 24 and contained in the receptacle of the sand layer elevator 20. At an upper portion of the sand layer elevator 20, the position of the bottom plate is fixed to contain the sand of one layer.

When the sand sprinkler 24 and the sand roller 26 have been moved back, the mask 38 is located above the sand layer elevator 20 supplied with sand. The distance between the mask 38 and the top of the sand is set to several millimeters.

After the above initial operation has been carried out, the operation as shown in FIG. 3 is repeated. That is, while the sand of one layer is contained in the sand layer elevator 20 and the mask 38 is located above the sand layer elevator 20, the diffused laser irradiation source 16 is moved above the mask 38 by the XY plotter 18 and irradiates a laser beam onto the mask 38.

Thereby, the resin coated onto an exposed portion of the sand is thermally cured and the portion is set. In this example, at the time of laser exposure, the diffused laser irradiation source 16 is moved over the mask 38 several times to uniformly irradiate a laser beam onto the entire area of the mask 38.

When the laser exposure is completed in this way, the mask is moved toward this side together with the sand sprinkler 24 and the sand roller 26 by the movable cylinder 30. After the bottom plate of the sand layer elevator 20 is moved down by a one layer thickness and the mask 38 on the mask holding material 32 is simultaneously transferred to the mask collection base 36 by the mask moving unit 40, the mask exchange operation is performed by carrying the next mask 38 on the mask support base 34 to the mask holding material 32.

The operation of forming each layer by sprinkling sand, setting a mask above the sand and irradiating a laser beam as described above is repeated to form a 3-D structured sand mould. The Sand mould thus formed is used to carry out casting.

[Diffused laser Irradiating Source]

Figures 3A, 3B:
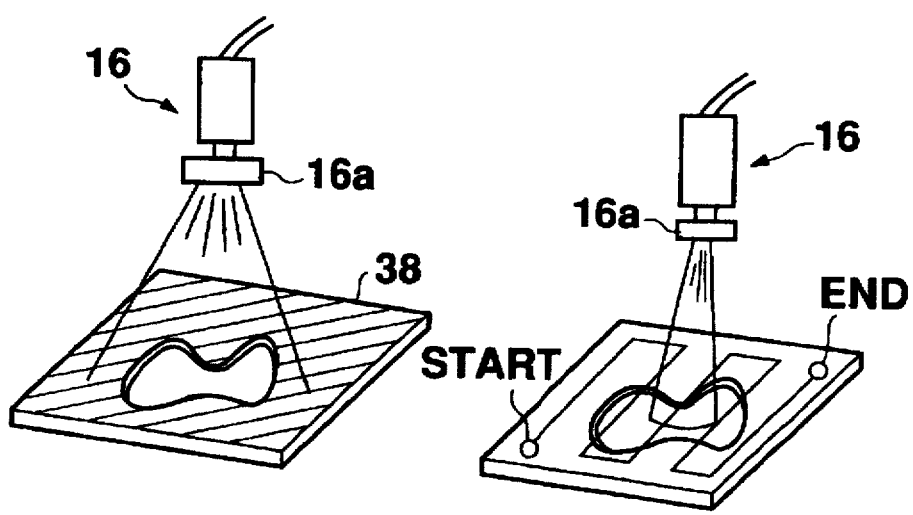
FIG. 3(A) and 3(B) show examples of a laser radiation source.

A fixed type of diffused laser irradiating source as shown in FIG. 3(A) may be used as the diffused laser irradiating source 16. In this example, the diffused laser irradiating source 16 has a concave lens 16a to expand the spot diameter of a high-output laser beam from a carbon dioxide gas laser or the like up to several tens of centimeters and irradiate the expanded laser beam onto the mask 38. Thereby, the laser exposure can be completed while the diffused laser irradiating source 16 is fixed. When such a diffused laser irradiating source 16 is used, the XY plotter 18 may move only in the X axis direction for shunting and the diffused laser irradiating source 16 may be fixed on the Y-axis rail 18b.

The diffused laser irradiating source 16, as shown in FIG. 3(B), may scan in both X and Y directions. That is, in his example, the diffused laser irradiating source 16 expands the spot diameter of a laser beam having a beam diameter of 0.2 mm to several millimeters to several tens of millimeters and irradiates the expanded laser beam. Therefore, it cannot irradiate the laser beam onto the entire area of the mask as is. It is then moved by the XY plotter 18 to scan over the entire area of the mask 38 to complete the irradiating step.

In any one of the diffused laser irradiating sources 16 shown in FIGS. 3(A) and 3(B), the irradiation energy of the laser is set to an amount of energy suitable to cure the resin of 0.2 mm resin coated sand.

[Mask]

The mask 38 is formed of a durable sheet material that can shade laser light and has holes for portions to be set. When, for example, a carbon dioxide gas laser or a YAG laser is used, copper or iron sheets having cut-out portions are used. The mask 38 can be machined easily with an NC laser cutting machine or the like. Since a laser beam irradiated has relatively low energy density only for curing a single layer of thermosetting resin coated sand (0.2 mm), a metal sheet has sufficient durability as the mask 38.

According to shape, a cut-out portion of the mask 38 may be separated from other portions. For instance, to produce a sand mould like a square measure as shown in FIG. 4(A), a bottom portion of the mask 38 is only a frame-like peripheral portion 38a as shown in FIG. 4(B). Though there is no problem in this case, an upper portion above the bottom portion of the mask 38 requires a square island 38b at the center. In this case, the island 38b must be connected to the peripheral portion 38a by supports 38c.

In this embodiment, as shown in FIGS. 4(C) and 4(D), the positions of the supports 38c for the masks of adjacent sections are made different from one another. Thereby, uncured portions below the supports 38c are not continuous in a vertical direction. This uncured layer is thin and the width is small (for example, 0.2 mm×5 mm). Therefore, even if a space corresponding to this uncured layer is produced in the sand mould, molten metal does not enter this space during casting. Further, an advantage can be obtained wherein this space functions as a gas vent hole during casting.

When a YAG laser beam is used as the laser beam, the YAG laser beam passes through quartz glass. Then, as shown in FIG. 5, a mask portion 38e may be formed on a quartz glass substrate 38d by the vapor deposition of a metal. By this means, an island does not have to be connected by supports. A gas vent hole need not function as a support and may be suitably formed.

Positioning pins may be provided at four corners of the mask 38 so that they can be used advantageously for positioning the mask at the time of transport or mounting. Further, guides may be provided on the mask support base 34 and the mask collection base 36 to surround the mask 38 for position determination of the mask 38. A stopper may also be provided on the sand layer elevator 20 at an appropriate position for position determination of the mask 38, or various sensors may be used to carry out accurate position determination.

[Sand]

Conventionally used sand cannot be directly used as the sand used in this embodiment of the present invention. So-called shell mould resin coated sand which is used to produce cast iron and aluminum castings is generally blown into a heated metal mould, baked and set. In this application, relatively coarse sand (15 to 30 nm, for example) is used to exhaust a generated gas the time of casting. However, in the present invention, a layer of about 0.2 mm must be formed and sand having spherical grains as fine as 5 to 10 nm is employed. In this embodiment, gas vent holes are formed as described above.

Further, quartz sand is generally used as the resin coated sand and its thermal expansion coefficient is about 60 to 100. When this sand is used in this embodiment, it is expanded by exposure to laser light and causes thermal deformation and cracking. Low-expansion sand such as zirconia sand or mullite sand (both having a thermal expansion coefficient of about 30 to 50) are therefore suitable in this embodiment. According to application purpose, metal powders, ceramic fine particles, or the like may be used.

Various types of resins are used as the resin for coating according to casting process. In this embodiment, it is particularly important to clearly define the boundary between a heat laser exposure area and a non-exposure area and increase dimensional accuracy. Sand having a narrow range of curing reaction temperature or good peel back property is then preferred.

[Sand Sprinkler]

FIG. 6 shows a sand supply structure such as the sand sprinkler 24. The sand sprinkler 24 consists of a hopper-like container 24a and a rotary blade 24b arranged in an opening in a bottom portion thereof. By turning the rotary blade 24b, sand contained in the container 24a falls and is sprinkled. ON/OFF operation of sprinkling and the amount of sand sprinkled are controlled by controlling the rotation of the rotary blade 24b. On the rear side (this side in FIG. 1) of this sand sprinkler 24 in its traveling direction, there is provided a scraper 50. This scraper 50 is disposed between the sand sprinkler 24 and the sand roller 26 and connected to the connecting material 28. The scraper 50 flattens the surface of sand sprinkled by the sand sprinkler 24 while it moves to the right side in FIG. 6 (back side in FIG. 1). Further, the sand roller 26 provided behind the scraper 50 presses the surface of the sand flattened by the scraper 50 and compresses the sand to form one sand layer (0.2 mm) on the surface of the sand layer elevator 20.

In this way, in this embodiment, the sprinkling and rolling of the sand can be carried out efficiently by one time of movement, thereby making possible the high-speed formation of a sand layer. Further, as described above, since the mask 38 can be set above the sand layer during the movement for the formation of the sand layer, the time required for the processing of one layer is extremely short.

[Effect of This Embodiment]

In this way, according to this embodiment of the present invention, since a mask and a diffused laser beam are used, laser beam scanning is not necessary and, even if it is necessary, the number of scanning times is extremely small. Therefore, the processing of one layer quickens and hence, it is possible to reduce the time required for the formation of a sand mould as a whole. Since a sand mould can be mass-produced easily by using the formed masks many times, the sand mould is extremely suitable for casting mass-production.

Particularly when no mask is used and a laser beam having a small spot diameter is used as in the prior art, it is necessary to scan only portions to be exposed to laser light and control for this purpose is required each time of scanning. In addition, the time required for exposing all the portions to be exposed is prolonged.

Figure 7:
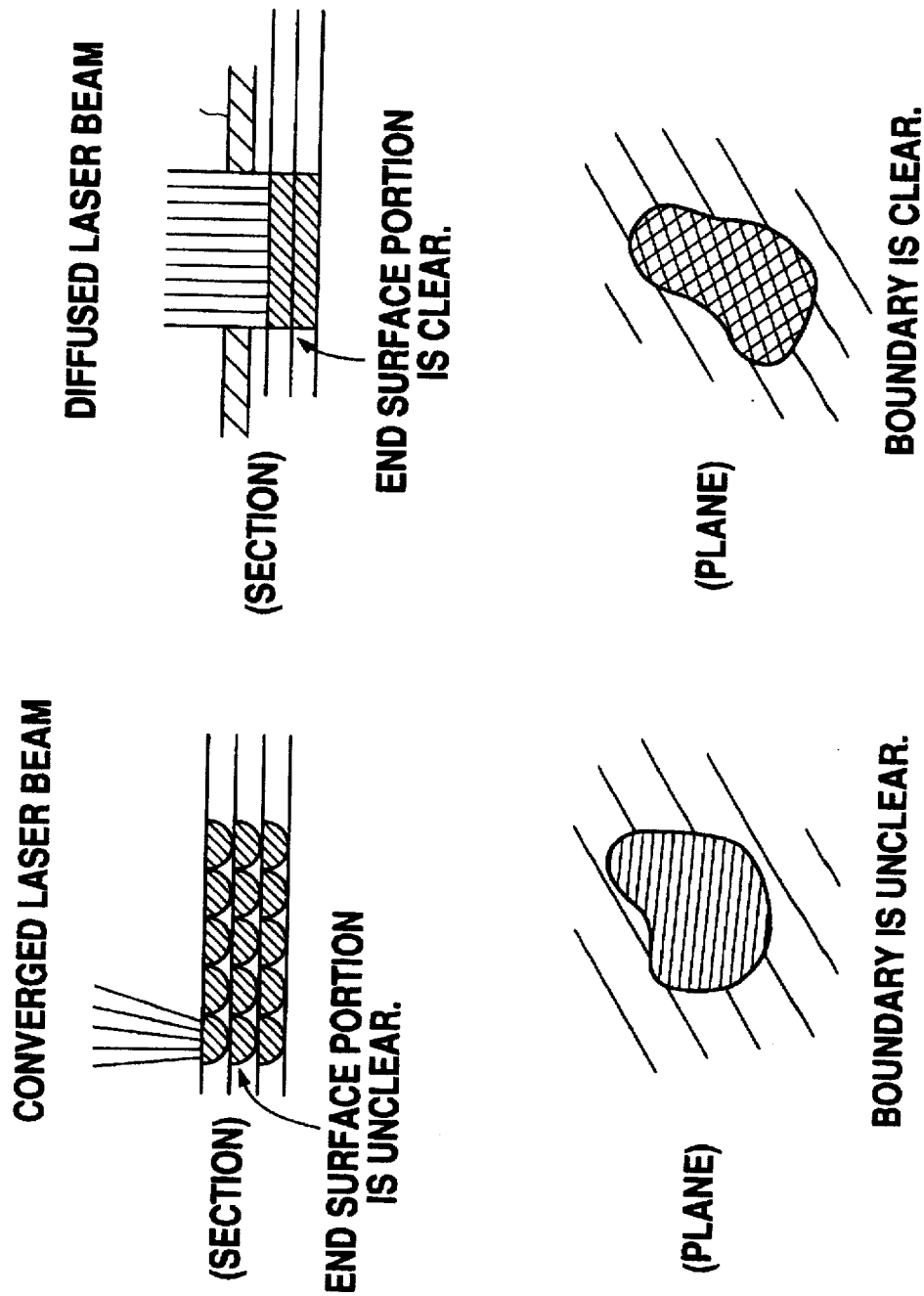
FIG. 7(A) and 7(B) show the comparison of a cured resin state between the first embodiment of the present invention and the prior art.

Further, since a converged beam is used in the method of the prior art, it is difficult to achieve uniform energy density and the area provided with energy is circular. Therefore, as shown in FIG. 7(A), a thermally cured area is shaped like a groove and its sectional and plane boundary forms become unclear. However, in this embodiment, a combination of a mask and a diffused laser beam is used to give uniform energy as shown in FIG. 7(B) and both the sectional and plane forms of a thermally cured area can be made clear.

In this way, according to this embodiment, a sand mould can be produced at high speed and castings can be mass-produced using this sand mould. In this respect, the method according to this embodiment of the present invention has the following advantages in the design of castings and preparation for production.

Figure 8:
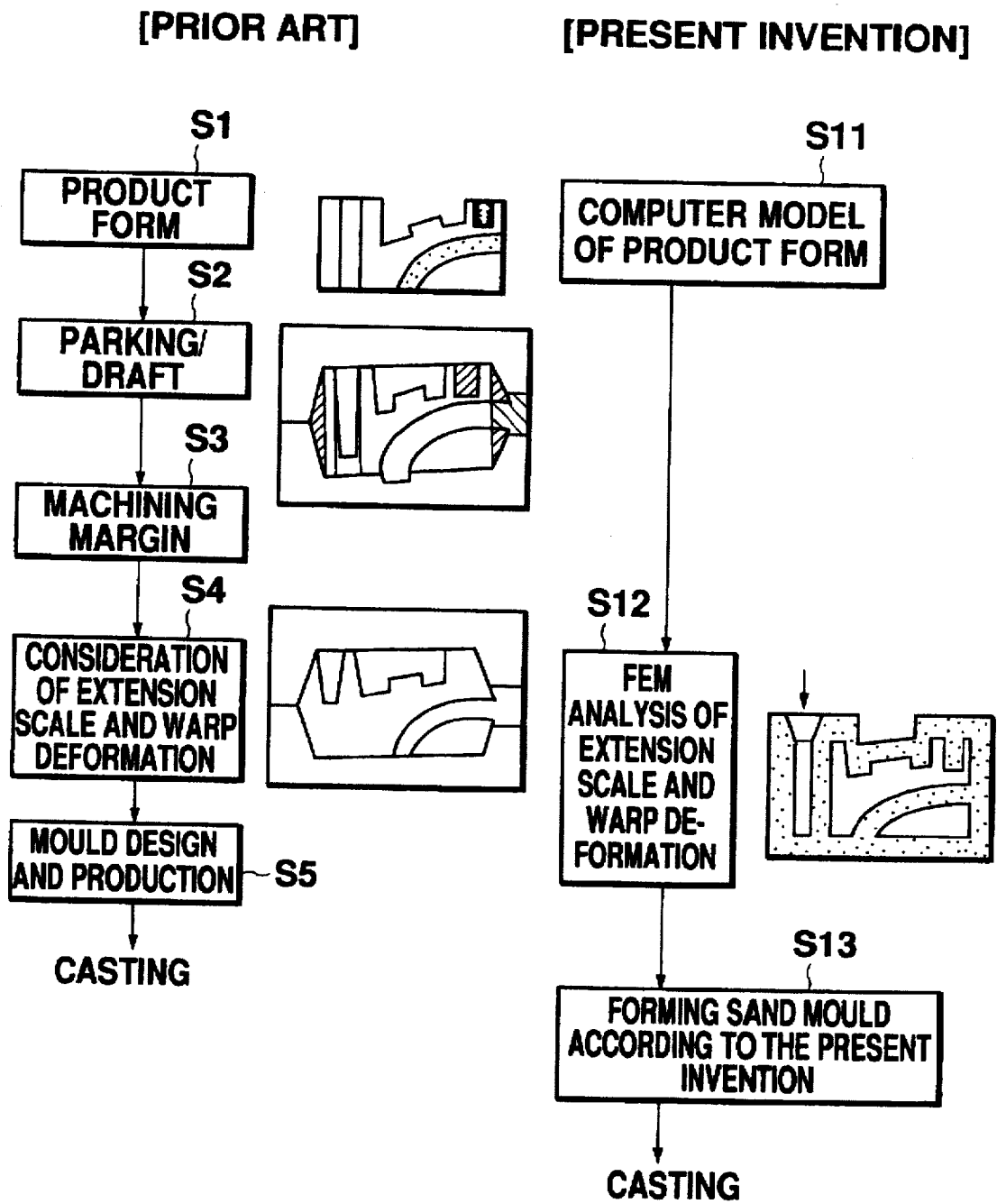
FIG. 8 is a diagram comparing the processing step between the first embodiment of the present invention and the prior art.

In the casting method of the prior art, as shown on the left side of FIG. 8, parting/draft (S2), machining margin (S3) and consideration of extension scale/warp deformation (S4) are carried out for a product shape (S1) required for the function of each product and mould design/production (S5) are performed. The sand mould thus produced is used to cast a product.

Therefore, as shown in S2, unnecessary portions (shown by oblique lines) are produced due to parting/draft as in a diagram shown next to S2. Since a product cannot be formed with only two moulds, a wood core is required. A casting which is obtained using such a sand mould is thicker than necessary and does not have the designed product shape. It must then be machined to the designed product shape. Casting bur caused by parting is produced in the product and must be shaved off. Further, as a machining margin is required for machining, the product becomes much thicker than necessary.

However, according to this embodiment, as shown on the right side of FIG. 8, a computer model having a product shape is formed by a CAD unit (S11). Thereafter, FEM (Finite Element Model) analysis of extension scale and warp deformation is carried out based on this and the shape of a sand mould is determined for each section to form the sand mould based on the result of this analysis (S12). Then, based on this sectional form, each layer is formed to obtain a sand mould (S13) and casting is carried out using this sand mould.

Since the sectional forms of a sand mould may be laminated one upon another from the computer model having the designed product shape at the time of designing the sand mould, it is not necessary at all to take into consideration parting and draft. Therefore, a mask is formed for each section and used to form a sand mould as described above, whereby the final sand mould has the designed product shape as it is and a casting obtained using the sand mould is no thicker than necessary as in the prior art and is extremely close to the designed product shape. Therefore, a high-accuracy casting can be quickly mass-produced.

Extension, curvature, and the like at the time of casting also occur in this embodiment. However, the shape of a sand mould for obtaining a finally required product can be calculated inversely by analyzing the amount of deformation from pouring of a molten metal to cooling in terms of thermoelastic plasticity by an FEM technique or the like. Since there is no change in the product shape for draft or the like, this calculation becomes simpler.

[Multiple Stations]

Figure 9:
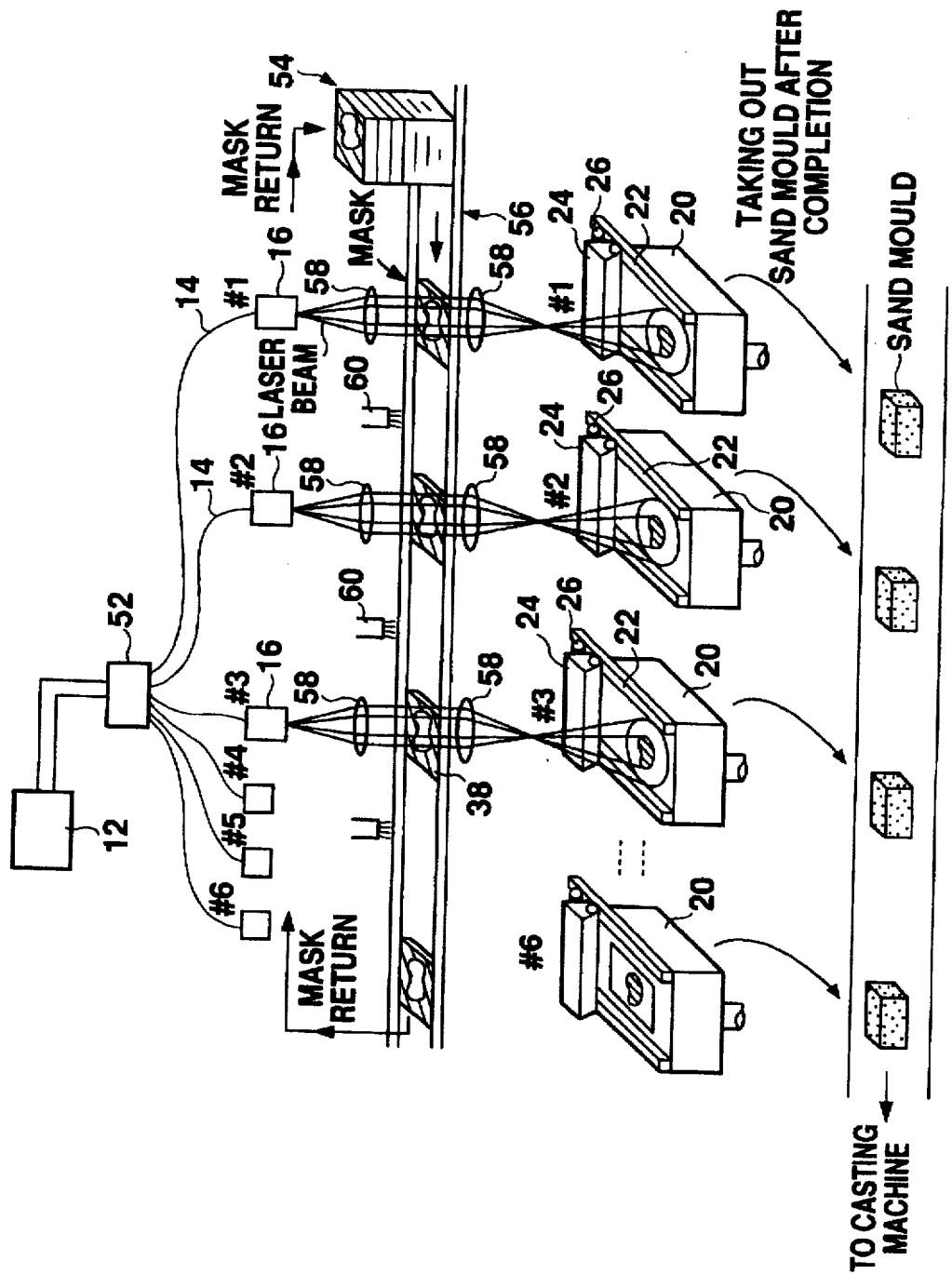
FIG. 9 is a diagram showing the configuration of multiple stations.

As described, according to this embodiment, the efficient production of a sand mould is possible. This production is more efficient when carried out in a plurality of stations. FIG. 9 shows an example of the configuration of multiple stations. As shown in the figure, the same numbers of diffused laser irradiating sources 16, sand layer elevators 20, and the like as that of stations are provided (six in this example). A laser beam from a single laser oscillator 12 is distributed to six diffused laser irradiating sources 16 (sequentially supplied) by a laser distributor 52.

The masks are mounted on a mask mounter 54 and a mask carrier 56 is provided below this mask mounter 54. The mask mounter 54 sequentially supplies the masks 38 to the mask carrier 56.

The mask carrier is arranged across all the stations and each mask 38 carried is located between a diffused laser irradiating source 16 and a sand layer of the sand layer elevator 20. To this end, the stations are arranged at equal intervals and the mask 38 is located at each station sequentially by moving it by the distance of this interval (1 step). The mask 38 passing through the sixth station is returned to the top of the mask mounter 54.

The operation of this apparatus is described. First, the mask 38 for the first layer is located at the first station. At this point, the sand of one layer is prepared in the sand layer elevator 20 of the first station. Thereafter, a laser beam is irradiated onto the sand of the first station by the diffused laser irradiating source 16 of the first station.

Then, the first mask 38 is moved to the second station by one step by the mask carrier 56 and the second mask 38 is located at the first station. At the first and second stations, a laser beam is irradiated. This process is repeated until the first mask is located at the sixth station and the sixth mask 38 is located at the first station. In this state, as shown in FIG. 10, after laser exposure is carried out sequentially at the first to sixth stations, the operations of moving down the sand layer elevator 20 by the distance of one layer, moving the mask 38 and sprinkling sand are repeated sequentially.

In this way, sand moulds corresponding to the number of stations (six in this example) can be formed simultaneously with one set of masks. Since the laser exposure time is short, a laser beam from a single laser oscillator 12 can be distributed as shown in the figure. Since the distance between the diffused laser irradiating source 16 and sand is relatively large in this example, a pair of lenses 58 are used to accurately irradiate light passing through the mask onto the sand.

Since the mask is exposed to a laser beam six times and the temperature of the mask is elevated, a cooling unit 60 such as an air cooling unit is added.

In this way, productivity can be greatly increased.

[Second Embodiment]

Figure 11:
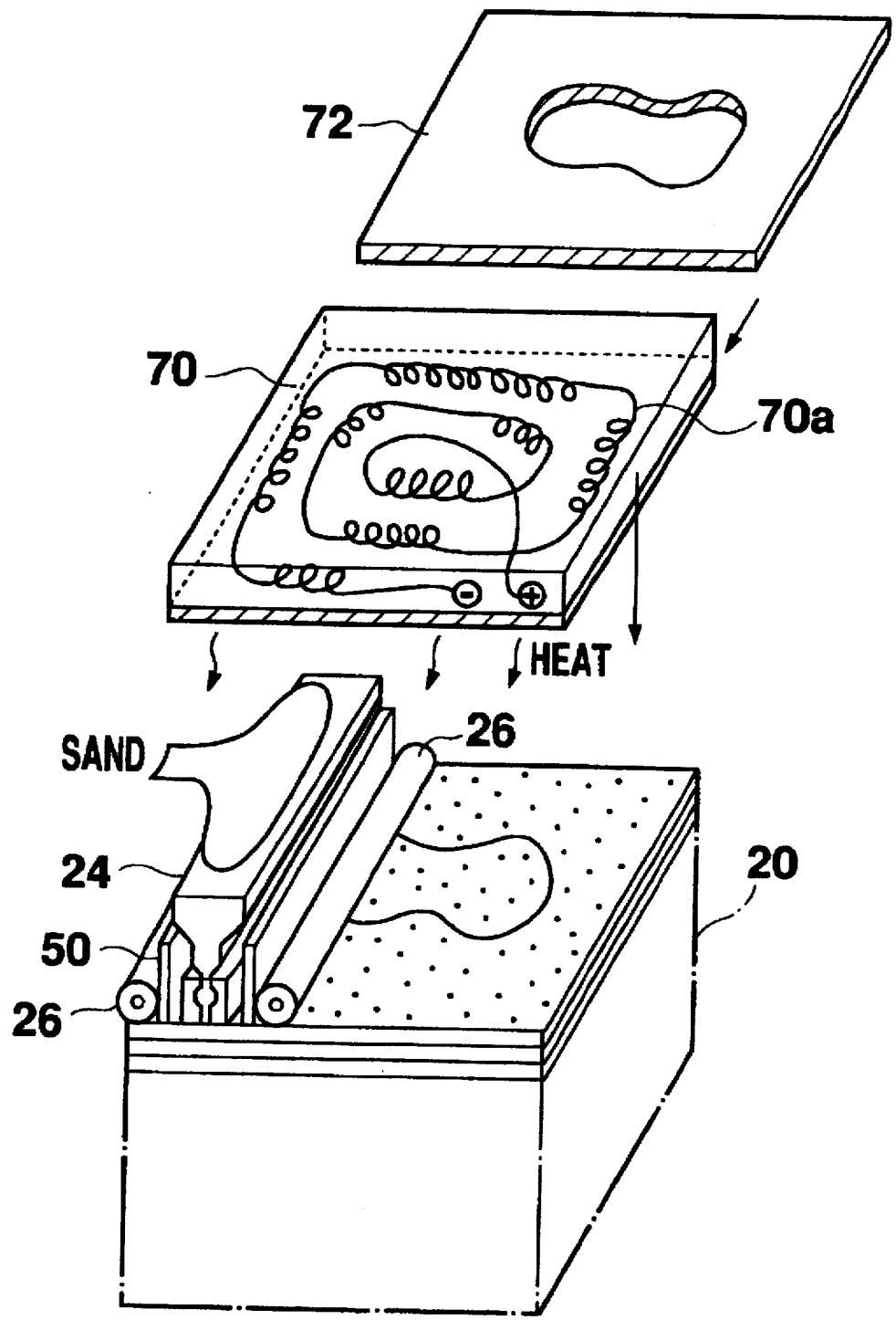
FIG. 11 is a diagram showing the configuration of a second embodiment of the present invention.

FIG. 11 is a diagram showing the entire configuration of a second embodiment of the present invention. A plate heater 70 incorporates a heat generator 70a such as a nichrome wire which generates heat from the entire surface thereof when it is supplied power from outside. A heat insulating mask 72 is almost the same as the shading mask 38 in the first embodiment and a predetermined number of the masks 72 having a predetermined shaped hole are prepared. This heat insulating mask 72 has the ability to shut off heat from the heater. Therefore, when the heat insulating mask 72 is installed below the heater 70, only sand below the hole is heated.

The constitutions of the sand sprinkler 24, the sand roller 26, the scraper 50, the sand layer elevator 20 and the like are the same as those of the first embodiment.

Figure 12:
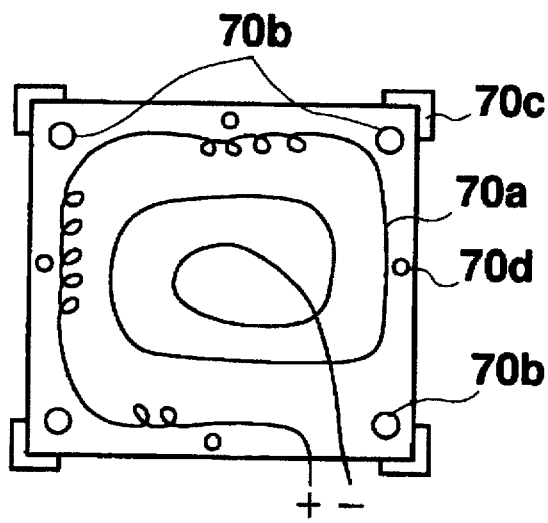
FIG. 12 is a diagram showing the configuration of a heater of the second embodiment.

After the sand of one layer is set in the sand layer elevator 20, the heater 70 in which the heat insulating mask 72 has been set is positioned above the band. Thereby, only the sand below the hole of the heat insulating mask 72 is heated and the resin is cured. Then, the heat insulating masks 72 are exchanged sequentially and each layer of sand is cured to form a sand mould. Heating efficiency is better as the mask is closer to the surface of the sand during heating. However, as it is recommended that the mask not be in direct contact with the sand, the gap between the mask and the sand is preferably 0.1 to 2 mm. Further, the heat insulating mask 72 is installed below the heater 70 at each time of curing. The heat insulating mask 72 is preferably sucked by vacuum or adhered by an electromagnet to the heater 70. For instance, when mask suction holes 70b are formed at four corners of the heater 70 as shown in FIG. 12, the heat insulating mask 72 can be sucked by vacuum through the mask suction holes 70b and the attachment and detachment of the heat insulating mask 72 can be controlled by the ON/OFF operation of the vacuum suction.

In this example, guides 70c are preferably formed around the mask attachment surface of the heater 70 for the positioning of the heat insulating mask 72 with respect to the heater 70 so that the heat insulating mask 72 can be positioned. Further, positioning pins 70d are also preferably provided. In this case, recess portions are formed in the heat insulating mask 72 at positions corresponding to the respective positioning pins 70d.

Figure 13:
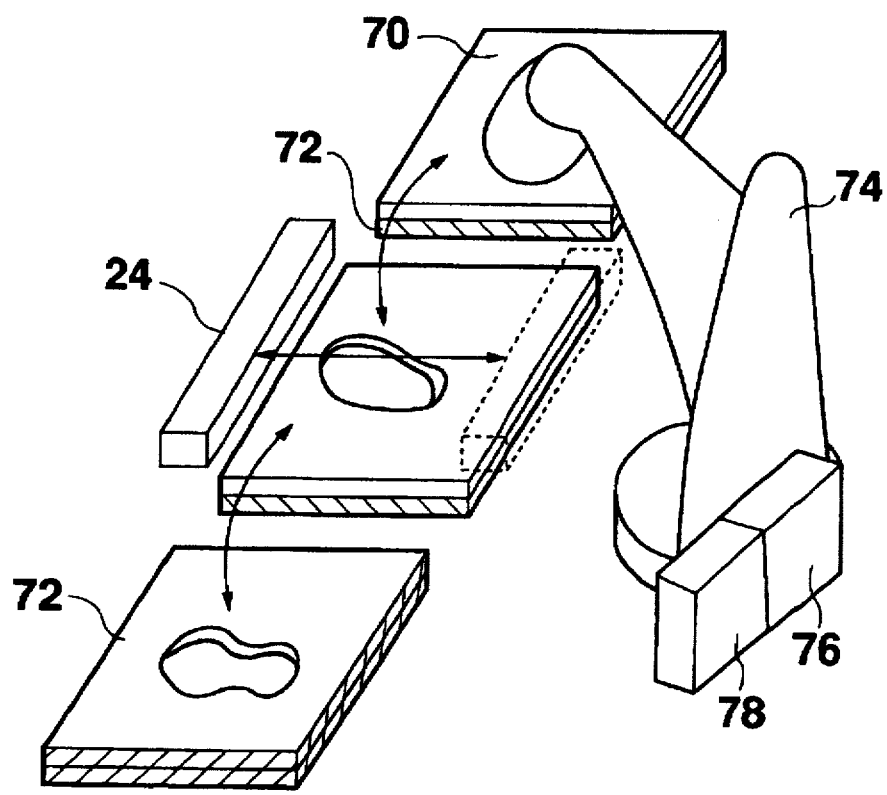
FIG. 13 is a diagram showing a transfer mechanism of the second embodiment.

Further, FIG. 13 shows a transfer robot 74 for transferring the mask. In this way, the heat insulating masks 72 are moved above the sand one after another by this transfer robot 74 and the heater 70 generates heat to heat the sand. That is, the operations of (i) sucking the heat insulating mask 72, (ii) moving the heat insulating mask 72 above the sand and positioning it, (iii) applying electricity to the heater 70a and (iv) removing the heat insulating mask 72 are repeated by this transfer robot 74, whereby a sand mould can be formed.

A heater control unit 76 controls the energization of the heater 70a by the transfer robot 74 and a suction control unit 78 controls the suction of the heat insulating mask 72 by the transfer robot 74.

According to this second embodiment, since the heater 70 is used as a sand heating source, this heating source is more inexpensive than the laser oscillator. Further, it is easy to increase the area of the heater 70, thereby making it possible to easily manufacture a large sand mould. Particularly when a sheet metal such as aluminum or copper is disposed below the heater 70, the sheet metal is heated at a constant temperature and, a large area can therefore uniformly heated. Sand moulds having a large area can then be produced with ease. Since the resin which is coated onto the sand is cured at about 300° C., it can be effectively heated by this heater 70.

A heat resistant material such as asbestos, ceramic or a metal (iron plate) having a high boiling point is used in the heat insulating mask 72.

Further, when multiple stations are prepared by arranging a plurality of the sand layer elevators 20 and the transfer robots 74 and the like as shown in FIG. 13 and transferring the heat insulating masks 72 one after another, a large number of sand moulds can be efficiently manufactured using one set of heat insulating masks 72.

[Third Embodiment]

Figure 14:
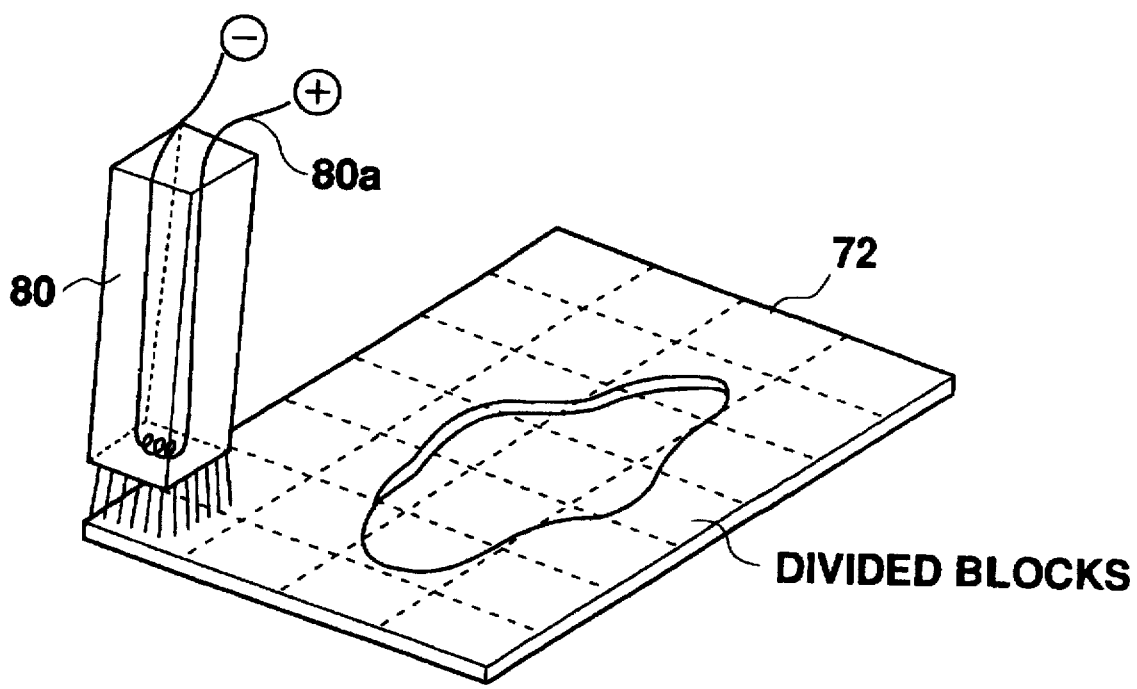
FIG. 14 is a diagram showing the configuration of a third embodiment of the present invention.
Figure 15:
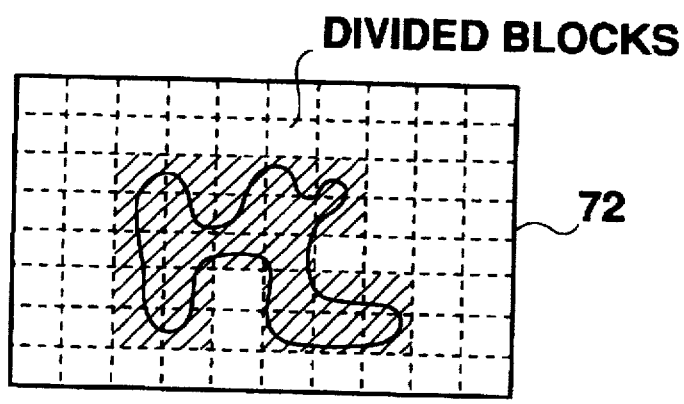
FIG. 15 is a diagram showing divided blocks of the third embodiment.

In this embodiment, as shown in FIG. 14, a large number of separate heat generators 80 are used in place of the heater 70 of the second embodiment. The entire area of the heat insulating mask 72 is covered by the large number of separate heat generators 80. That is, as shown in FIG. 15, each separate heat generator heats each divided block of the area of the heat insulating mask 72. Further, each separate heat generator 80 incorporates a separate heat generator 80a, whereby heat is generated independently.

Figure 16:
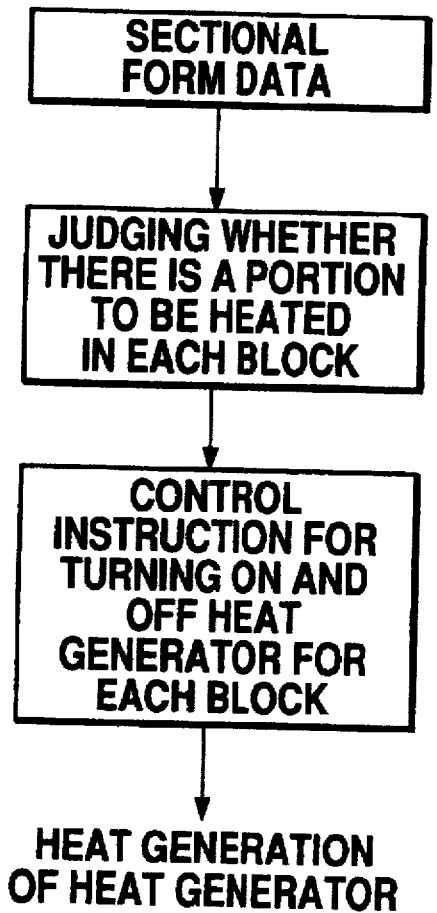
FIG. 16 is a flow chart showing the operation of the third embodiment.
Figure 17:
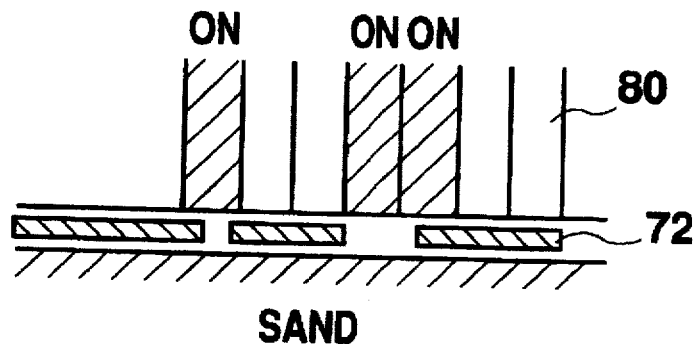
FIG. 17 is a diagram showing the heating state of the third embodiment.

When heating is to be carried out, as shown in FIG. 16, it is judged from sectional form data whether there is a shaped form (corresponding to the hole of the heat insulating mask 72) in each block and electricity is supplied only to the heat generators 80a of the separate heat generators 80 for the blocks where there is a shaped form. Thereby, as shown by oblique lines in FIG. 15, only the separate heat generators 80 above the hole of the heat insulating mask 72 generate heat. Therefore, as shown in FIG. 17, only sand below the hole is efficiently heated.

Since the heat generation of the separate heat generators 80 is controlled in this way, there is no unnecessary energy loss. In addition, the heat insulating mask 72 is not heated more than necessary and the service life of the heat insulating mask 72 can be extended.

Also in this third embodiment, more efficient production is made possible with a set of heat insulating masks by preparing multiple stations as in the first and second embodiments.

[Fourth Embodiment]

In this embodiment, the generation of a warp in each sectional form is prevented using a pedestal.

Figure 18:
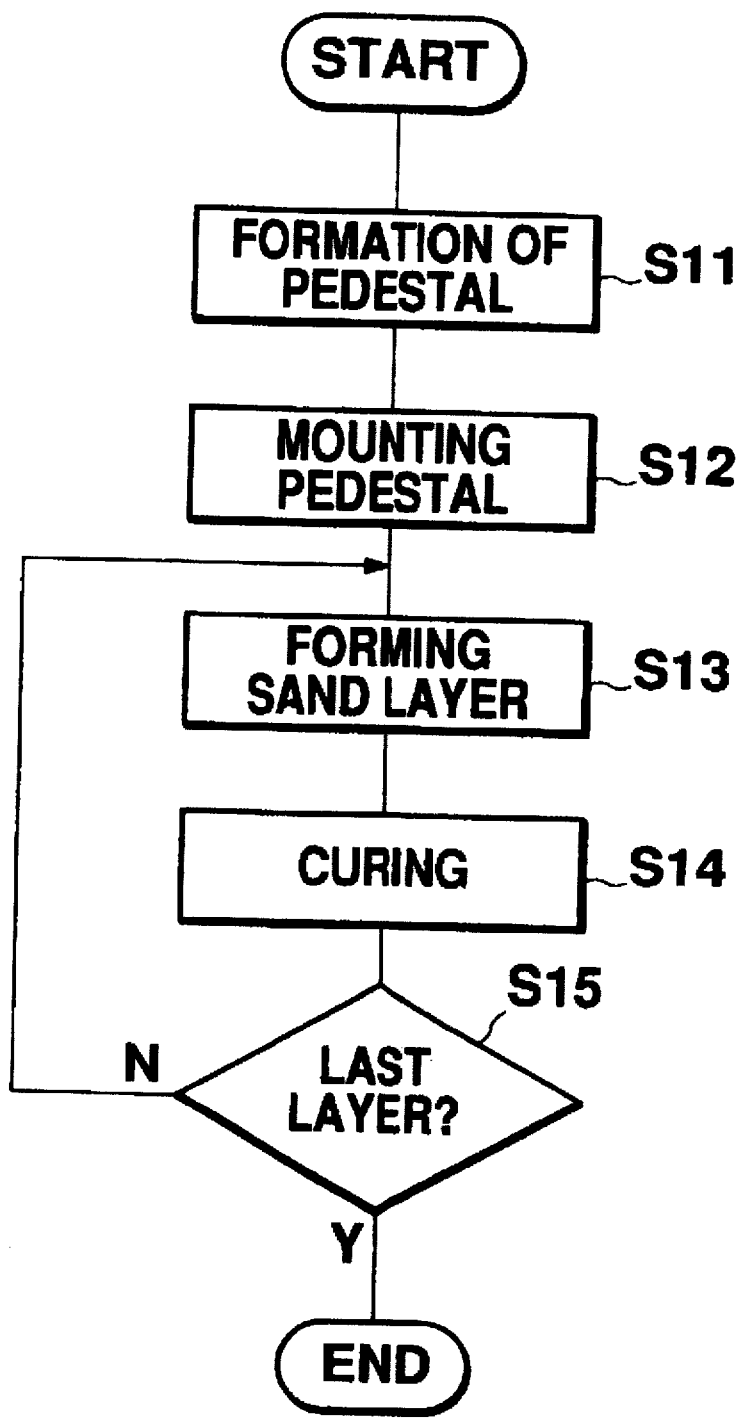
FIG. 18 is a flow chart showing the processing operation of the third embodiment.
Figure 19A:
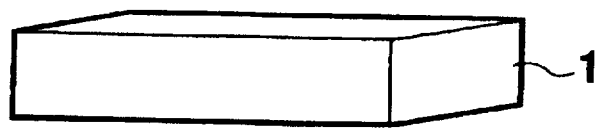
FIG. 19(A), 19(B) and 19(C) show the form of a pedestal and a sand layer formed on the pedestal.

As shown in FIG. 18, the pedestal is first formed (S11). This pedestal is formed by pouring sand coated with a resin (resin coated sand) into a heated mould and curing the resin as in the sand mould formation of the prior art. The pedestal should be thick enough to support the sand mould. For instance, the thickness of the pedestal may range from 1 cm to 5 cm according to the size of a sand mould. The area of the pedestal should be slightly larger than the forming area of a sand mould. The pedestal 1 can be a rectangular plate as shown in FIG. 19(A), for example.

The pedestal 1 is mounted on the bottom plate of the sand layer elevator (S12). This sand layer elevator is such that the bottom plate thereof can move vertically and thin sand layers (thermosetting resin coated sand) are formed on the bottom plate one after another by moving down the bottom plate as will be described hereinafter.

Figure 19B:
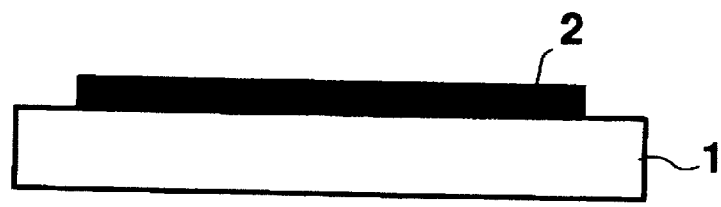
Figure 19C:
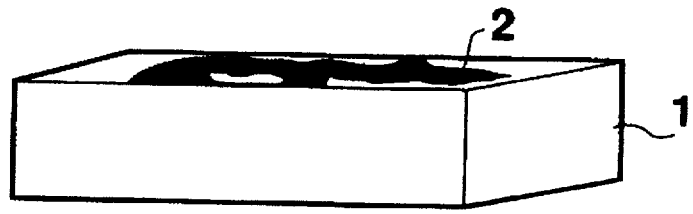

After the pedestal is mounted, the bottom plate is moved down by the distance of one layer and sand is sprinkled over the bottom plate to form a first sand layer (S13). For example, as shown in FIGS. 19(B) and 19(C), a sand layer 2 is formed on the pedestal 1.

A laser beam is then irradiated onto a portion of the sand layer 2 corresponding to the sectional form of a sand mould to cure the portion (S14). Since the sectional form of one layer is formed, it is judged whether this is the last layer or not (S15). If it is not, the routine returns to S13 to form each layer sequentially to form a 3-D sand mould.

According to this embodiment, a pedestal is used. This pedestal is formed into a desired shape having sufficient thickness using a metal mould. Therefore, the pedestal of this embodiment has a highly accurate surface.

In S13, the sand of the first layer is sprinkled over the pedestal to a required thickness of 0.1 to 0.5 mm and a laser beam is irradiated onto the sand. The pedestal and the sand layer are formed from the same material and the first layer is cured and adheres to the pedestal. Since the pedestal has sufficient strength, the first layer is not warped, thereby making it possible to prevent distortion. Further, since the next layer is formed on that layer, which is not warped, it is also not warped, whereby a sand mould without distortion can be formed.

To produce a product directly, the pedestal must be later removed. However, what is formed in this embodiment is a sand mould. Therefore, there is no problem with the pedestal which adheres to a sand mould and it rather increases the strength of a sand mould. According to a method which does not use a pedestal, the rear side of the first layer which is heated by a laser beam or the like cannot be formed finely and has low flatness. In contrast to this, by using a pedestal, the first layer having high flatness can be formed making use of the high flatness of the pedestal.

[Fifth Embodiment]

To suppress the shrinkage of a resin between sand grains, it is important to increase the bulk density of sand. That is, if the bulk density is high, it is possible to prevent the deformation of sand resulted by resin shrinkage at the time of curing.

Figure 20:
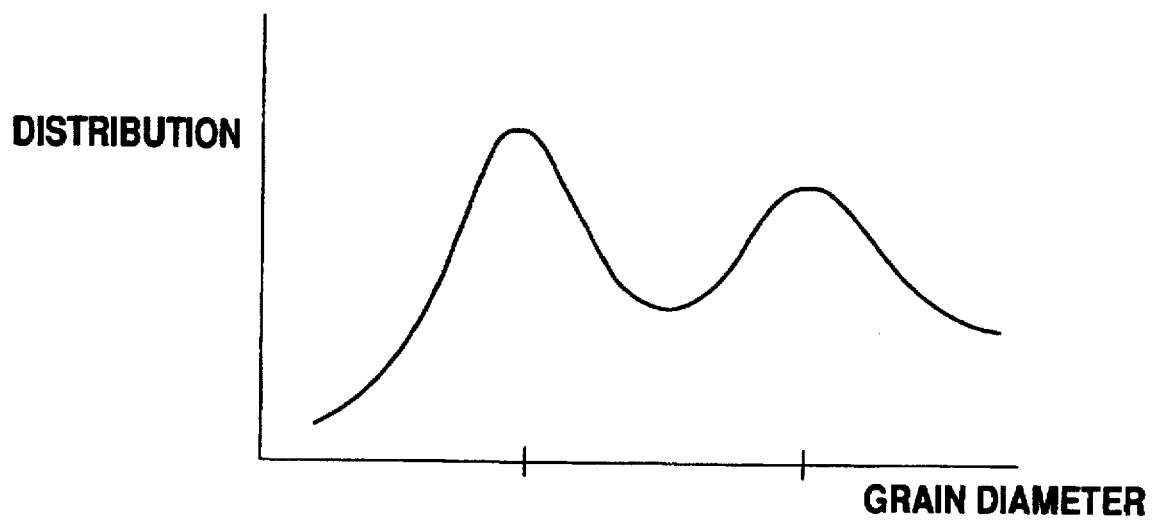
FIG. 20 is a diagram showing the grain diameter distribution of sand according to a fifth embodiment of the present invention.

In this embodiment, as shown in FIG. 20, the grain size distribution of sand used is not set to a standard normal distribution, but to a grain size distribution having two peaks. That is, the distribution is set to have a peak for major grains and another peak for smaller grains.

Thereby, small grains enter the space between large grains (major grains), thus increasing the bulk density.

The peak grain diameter of smaller sand grains is preferably set to ½ to ¹⁄₁₀ that of major sand grains. For instance, when the peak diameter of major grains is set to 50 μm and the peak diameter of smaller grains is set to 10 μm, the bulk density can be greatly increased.

By increasing the bulk density of the sand, the generation of a warp during the shrinkage of the resin can be suppressed and a sand mould without distortion can be formed. Further, it is advantageous to form a sand layer of two different sand grains on the pedestal of the first embodiment.

When the bulk density is increased, the air permeability of a sand mould decreases. Then a fine groove may be formed in a portion of a sand mould at the time of forming a section. For instance, a bridge for supporting the isolated island of the above-described mask is suitable for this purpose.

[Sprinkling of Sand]

According to this embodiment, a sand layer is formed from two different types of sands. However, when two different types of sand which differ in grain diameter are sprinkled together and a thin layer is formed by the roller and the scraper, smaller grains are liable to accumulate towards the bottom of the layer and larger grains towards the top of the layer. Therefore, the upper part of the layer tends to have a lower bulk density.

Figure 21:
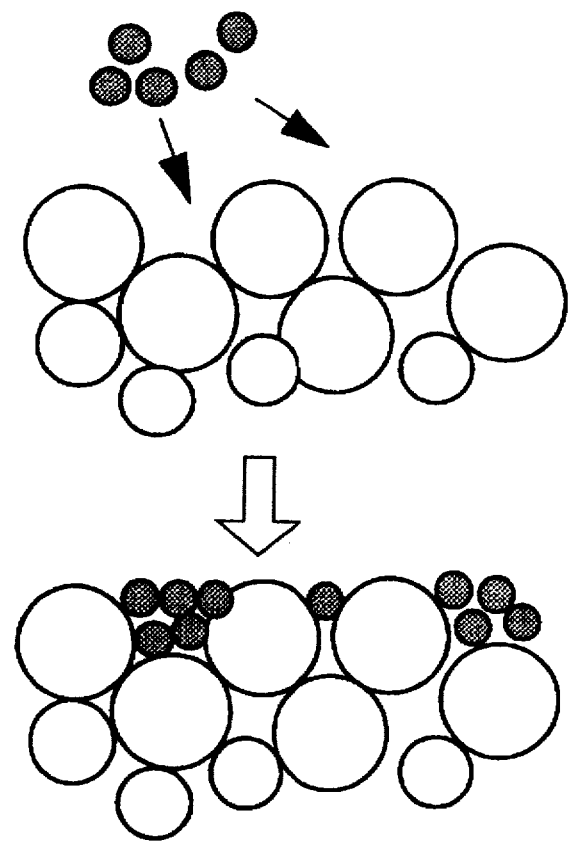
FIG. 21 is a diagram showing how two types of sands are sprinkled.

Therefore, in this embodiment, as shown in FIG. 21, the sand having a relatively large grain diameter is sprinkled before the sand having a relatively small diameter. Thereby smaller grains enter the space between larger grains which were sprinkled first, resulting in increased bulk density.

The sand having a smaller grain diameter is used only in an amount that fills the space between larger grains, i.e., about 1/5 to 1/20 that of larger grains. Thus the packing can be effectively increased using a small amount of this sand.

Figure 22:
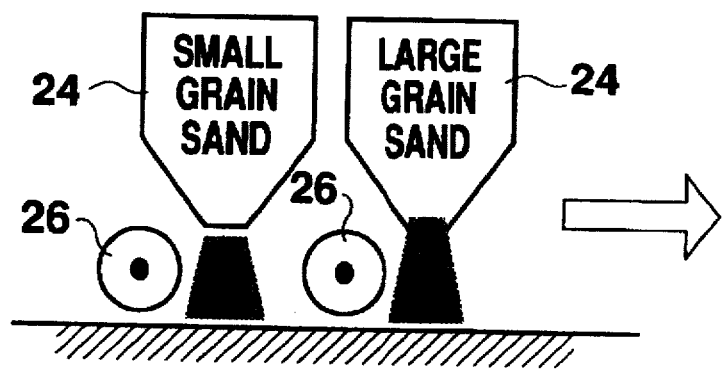
FIG. 22 is a diagram showing two different sprinklers.

Further, as shown in FIG. 22, when a sand sprinkler 24 for sprinkling the sand having larger grains and a sand sprinkler 24 for sprinkling the sand having smaller grains are provided and are moved together to sprinkle two different types of sands, these two different types of sands can be sprinkled in parallel, thus making it possible to reduce the time required for sprinkling. The roller 26 is intended to roll the surface of the sprinkled sand.

[Sixth Embodiment]

To increase the bulk density of sand, vibration or pressure is preferably given. Therefore, this is done in this embodiment.

Figure 23:
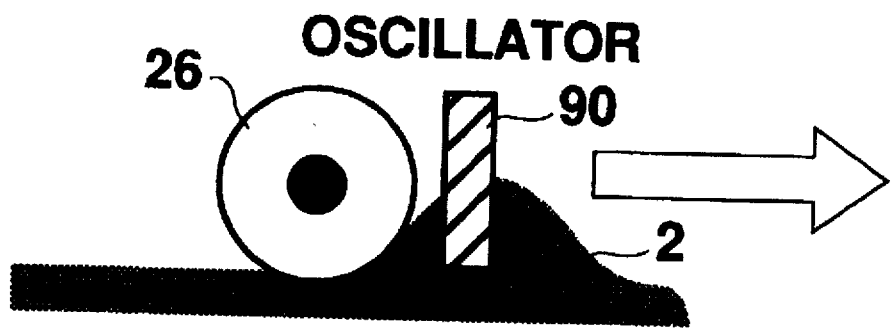
FIG. 23 is a diagram showing an example in which vibration is applied by an oscillator according to a sixth embodiment of the present invention.

FIG. 23 shows an example in which vibration is used. As shown in the figure, an oscillator 90 is arranged before the sand roller 26 to give vibration to sand to be rolled by the sand roller 26. Then the sand roller 26 and the oscillator 90 are moved together to increase the bulk density of the sand. As the oscillator 90, an oscillator which vibrates at a frequency of several tens of Hz by the rotation of a motor or an ultrasonic transducer from which high-frequency vibration can be obtained may be used.

Figure 24:
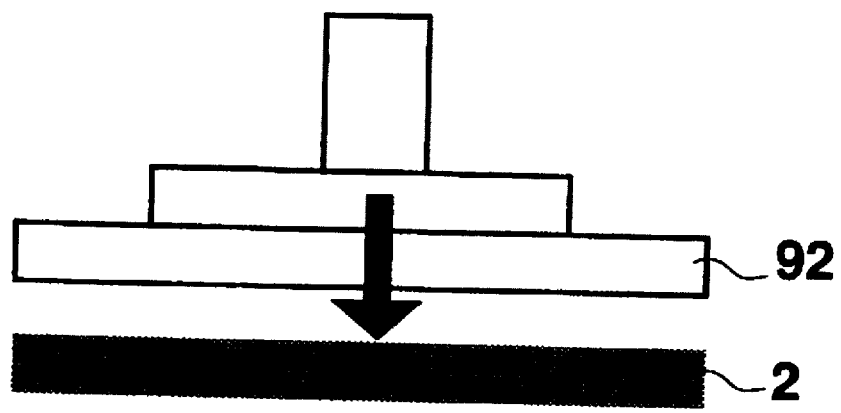
FIG. 24 is a diagram showing an example in which sand is compressed by a plate.

Further, FIG. 24 shows an example for increasing the packing of a sand layer by compression. As shown in the figure, a plate 92 is pressed against a sand layer 2 and the sand packing of the sand layer 2 is thereby increased. This plate 92 may be vertically driven by a motor or hydraulics. When the compression pressure reaches a predetermined value, the downward movement of the plate 92 may be stopped.

It is preferred to carry out compression processing after vibration is given to form a sand layer. Further, this embodiment may be combined with the fourth and fifth embodiments.

According to this embodiment, the bulk density of sand can be increased without fail. Therefore, a sand mould having almost no distortion can be obtained by suppressing the generation of a warp during the curing of the sand.

[Seventh Embodiment]

This embodiment is characterized in that supports for the formation of a mask are automatically designed.

[Entire Processing]

Figure 25:
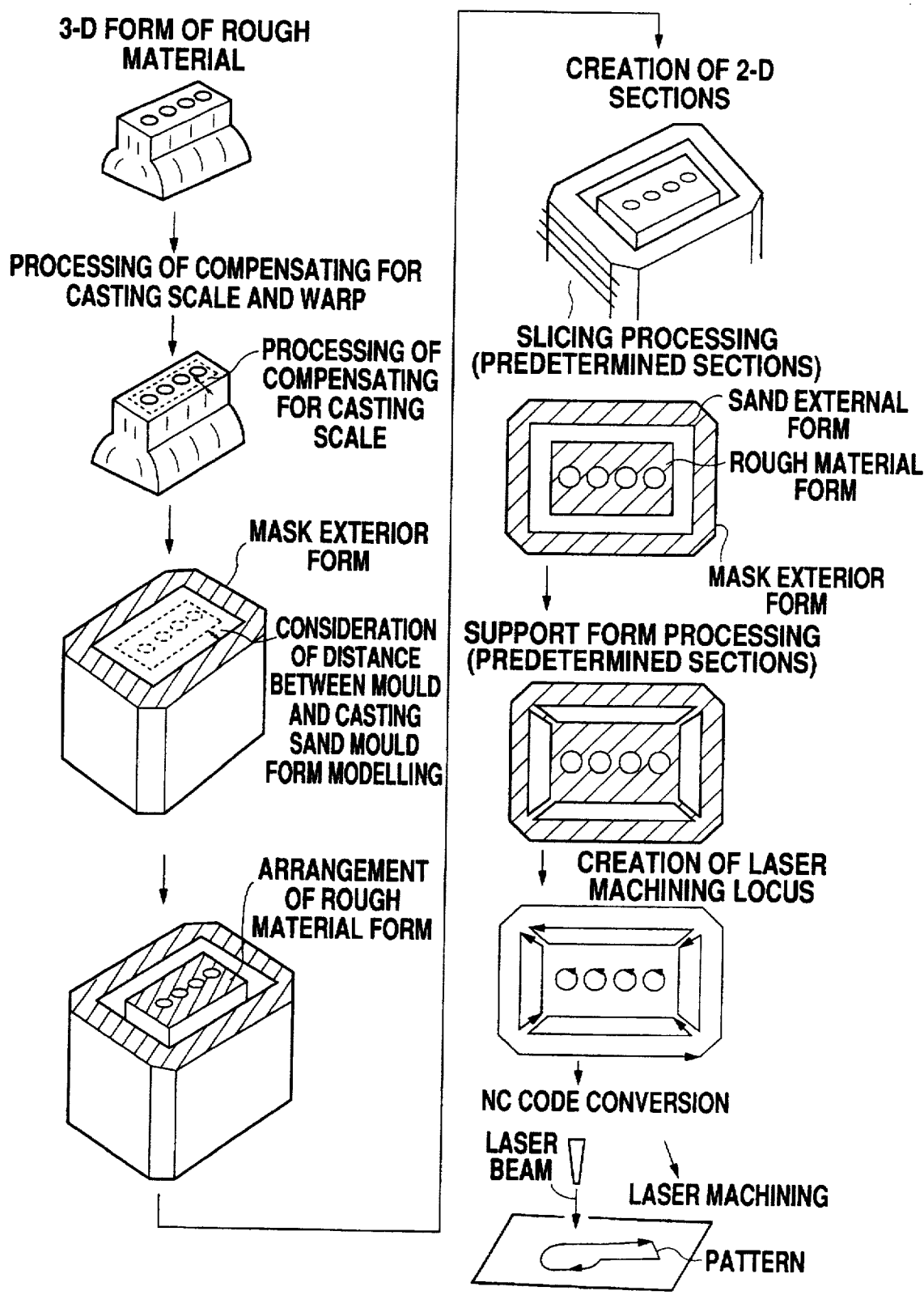
FIG. 25 is a diagram explaining the process of producing a mask according to a seventh embodiment of the present invention.

A description is first given of the entire process of forming a mask with reference to FIG. 25. A casting scale for compensating for a contraction margin generated when a casting is produced is added to a 3-D form of an object (rough material) to be produced by casting to correct the 3-D form of the rough material. That is, since the production of a casting is performed at high temperatures, the 3-D form of the rough material at normal temperature is corrected to a desired form produced at high temperatures. This compensation processing is automatically carried out by the casting scale function of a conventional 3-D solid modelling system. At the same time, compensation for a warp is taken into consideration.

Based on this corrected 3-D form of the rough material, an external sand form required for casting this material is designed by a 3-D system. This design is intended to obtain a thickness more than a predetermined value from the form of the rough material and can be carried out easily (modelling of the shape of a sand mould). At this point, the distance between a sand mould and a product is taken into consideration.

Thereafter, the corrected form of the rough material is arranged in the designed exterior sand form. The reverse form of the form of the rough material is the shape of a sand mould and the reversal of the form of the sand mould is the form of a mask. Therefore, the form of the mask is the form of the rough material and the processing is made possible by directly arranging the form of the rough material.

Since the mask form is produced in this way, the thus produced mask form is sliced at a pitch corresponding to a sand layer thickness of 0.1 to 0.3 mm to obtain a plurality of 2-D data (2-D sectional data).

Though masks are produced using the 2-D data thus obtained, there may be an island form corresponding to a sand core in the mask forms thus obtained. This island form is surrounded by a space and hence, is dropped as it is. Supports for supporting this island form are then required. In this embodiment, these supports are automatically created as will be described hereinafter.

Mask forms are determined by the above processing, and data on the form of the outer periphery of each mask form is automatically extracted and converted into NC codes. Based on the NC codes, iron sheets are machined by a laser to produce masks.

Using the masks thus obtained, a sand mould is produced and a product is cast using this sand mould.

In the production of a mould (sand mould) of the prior art, even if there is already a 3-D form of a product, draft for fabricating an external mould and a core mould for the formation of a cavity form, parting for dividing the mould, and the like must be designed. Therefore, extremely complex 3-D modelling is required. Further, since a 3-D form cannot be obtained as one-dimensional data, design must be carried out from the beginning to change design.

According to this embodiment, a mould for forming a sand mould consists of iron sheet masks having a 2-D form and only necessary portions thereof are exposed to a laser beam. A core form, draft form, parting and the like are not required. Therefore, mask forms for setting a sand mould are forms obtained by adding a casting scale to the form of a rough material to be produced and can be created by extremely simple processing. Since the form of the rough material is linked with mask forms, a 3-D form can be easily converted into one-dimensional form data and design changes can be made easily.

[Automatic Support Form Creation Algorithm]

Support forms become degassification forms at the time of casting when they are properly arranged and their existence is preferred. However, when they are not properly arranged, they damage the form of a rough material to be cast. If there are a large number of support forms, the number of outlines to be cut is large at the time of machining masks and hence, it takes too long to machine and cut by a laser, resulting in increased costs for mask formation.

Therefore, conditions for the formation of supports are as follows.

(i) They should not damage the form of a rough material.
(ii) The strength of each mask should be sufficient.
(iii) The number of supports should be minimal.
(iv) They must function effectively as a gas vent hole.

Figure 26:
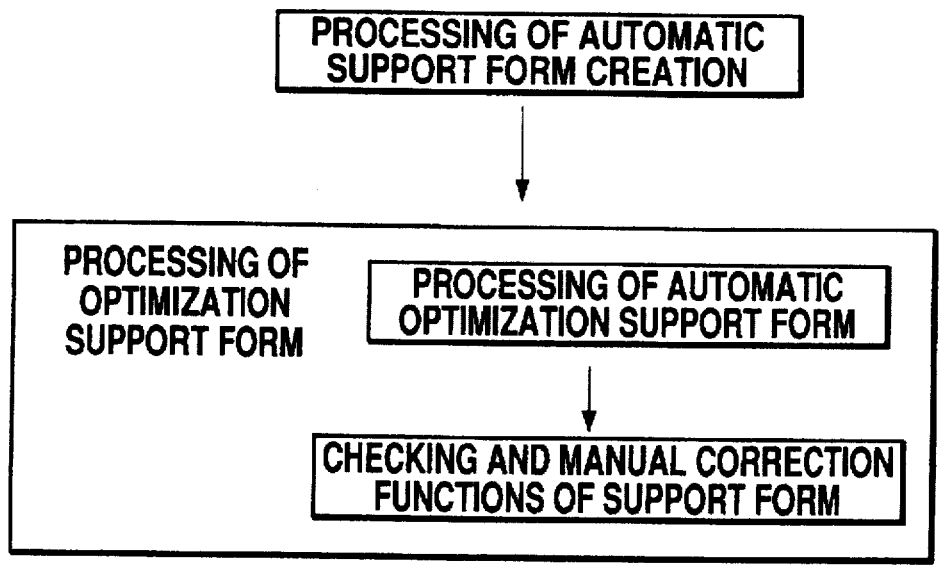
FIG. 26 is a flow chart showing the process of creating a support form.

In this embodiment, as shown in FIG. 26, each support form is created by the following steps.

An island form is extracted from a mask form by a predetermined algorithm and supports generated based on predetermined rules are automatically arranged in the space surrounding this island form.

Since the automatically generated supports are generated under predetermined conditions and are not always optimally arranged, automatic optimizing processing for rearrangement, for example, is made on these supports generated under predetermined conditions.

Although automatic optimization of the supports is carried out in this way, the arrangement of the supports is checked and corrected manually in the final step by a designer. There are cases under special conditions where supports must be reinforced or added which can be carried out manually.

Thus a mask form can be produced by efficiently adding supports. Since the production of each mask form is basically carried out automatically, the burden of a designer is greatly reduced. Since supports can be automatically generated from a 2-D sectional form obtained from a 3-D form of a rough material which is stored as collected data, modifications caused by design changes can be made easily.

[Automatic Support Form Creation Processing]

When a support comes into contact with the form of a rough material, its form is impaired. That is, when the support gets into contact with the form of a rough material, both are combined into one at that contact position and the form of the rough material at that contact position is impaired. meanwhile, a normal rough material has a large number of outlines in X and Y directions. Then, a support pattern is formed by oblique parallel lines always angled at 45° in a design coordinate system for the form of a rough material. This can prevent the support from coming into contact with an end portion of the rough material and the rough material from becoming larger by the width of the support. Molten metal does not enter the section of the support and the support functions as a gas vent hole if it is independent, and it does not have an adverse effect on the form of the rough material.

Figure 27:
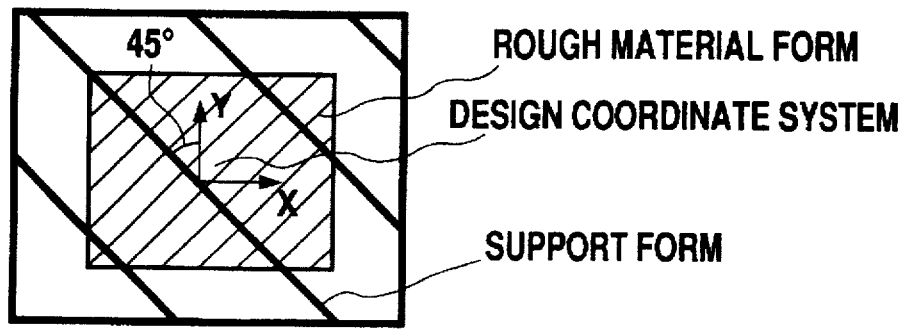
FIG. 27 is a diagram showing the configuration of oblique support forms.

For instance, when the form of an island in the form of a rough material is rectangular, as shown in FIG. 27, supports are automatically generated in a direction of 45° and only a space portion is extracted as the supports.

The direction of 45° may be unpreferred according to rough material. This value is used as a parameter and an arbitrary value can be input. Further, the pitch (interval) of the supports is made changeable.

If the supports are arranged at the same positions in masks for respective layers, the supports are continuous and the form of the continuous supports becomes a part of a casting. Then, the forms of supports for respective layers must be changed (shifted).

Figure 28:
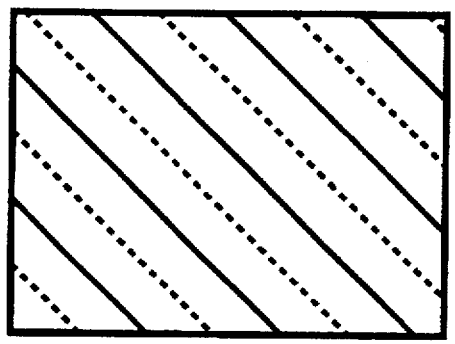
FIG. 28 is a diagram showing configuration when two different oblique support patterns are used.

For instance, in the case of patterns in one direction as shown in FIG. 28, pattern settings are changed for each layer to prevent the continuation of the same patterns. In the figure, a pattern shown by solid lines is the pattern of this layer and a pattern shown by dotted lines is the pattern of an adjacent layer. According to this technique, two different patterns may be alternately used and pattern creation is extremely simple. However, when an island portion and a space portion are large, the strength of the entire mask may be insufficient in this technique.

Figure 29:
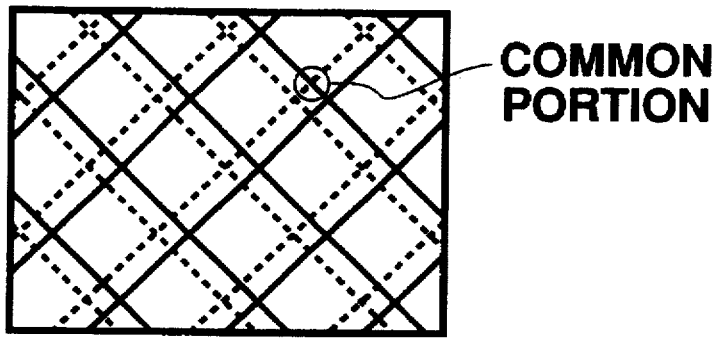
FIG. 29 is a diagram showing configuration when two different lattice support patters are used.
Figure 30:
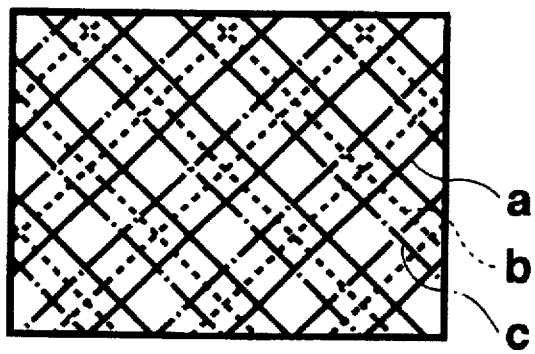
FIG. 30 is a diagram showing configuration when three different lattice support patterns are used.

Then it is preferred to create a lattice pattern when an island portion and a space portion are large. When two different lattice patterns are prepared and used alternately, as shown in FIG. 29, common portions are produced and form parts of a casting. Then, as shown in FIG. 30, three different patterns (patterns a, b and c in this case) are prepared and used in the order of a, b, c, a, . . . This prevents the production of common portions. In FIG. 30, pattern a is shown by solid lines, pattern b by dotted lines and c by one-dotted chain lines.

<Pattern Determination>

The arrangement method of such supports differs according to the form of a part to be cast. Therefore, it is preferred that the arrangement pattern of supports for each layer can be changed. In this embodiment, the arrangement of supports can be determined by specifying the following parameters.

(i) Designated number of support patterns: N

The number of support patterns that should be used is determined by this parameter N. In the above example, 2 or 3 is selected.

(ii) Designated number of repetitions of mask: M

The number of times the same pattern should be used repeatedly is determined by this parameter M. This can designate the number of supports arranged at the same position and can control the size of a gas vent hole.

Parameters M and N are shown in FIG. 31. In this way, an M number of support patterns are for a first form and the next M number of support patterns are for a second form and used in up to an N-the form.

(iii) Inclination G

Although G is a default and set at 45°, it can be changed to an arbitrary value.

(iv) Pitch

As shown in FIG. 32, pitch 1 shows the pitch of supports in a direction of −45° and pitch 2 shows the pitch of supports in a direction of 45°. By setting pitches 1 and 2 at 0, no supports are arranged in these directions. Though the inclination of a support can be changed by this parameter G, the supports in two directions always cross each other at a right angle. If G=60 and pitch 1 is −60°, pitch 2 is 30°.

(v) Support width: W

The width of a support is determined by this parameter M.

Figure 33:
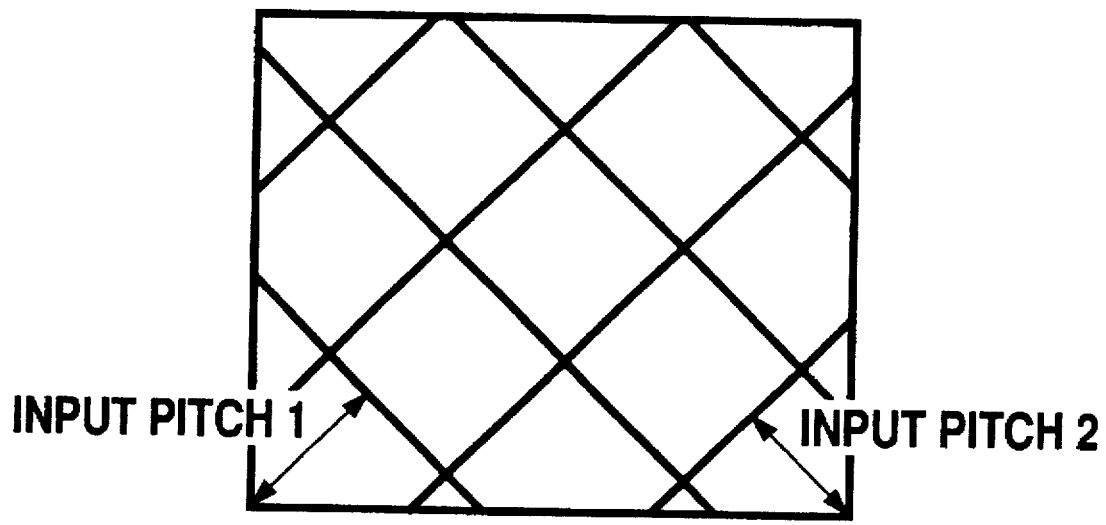
FIG. 33 is a diagram showing the arrangement of supports in a first pattern.
Figure 34:
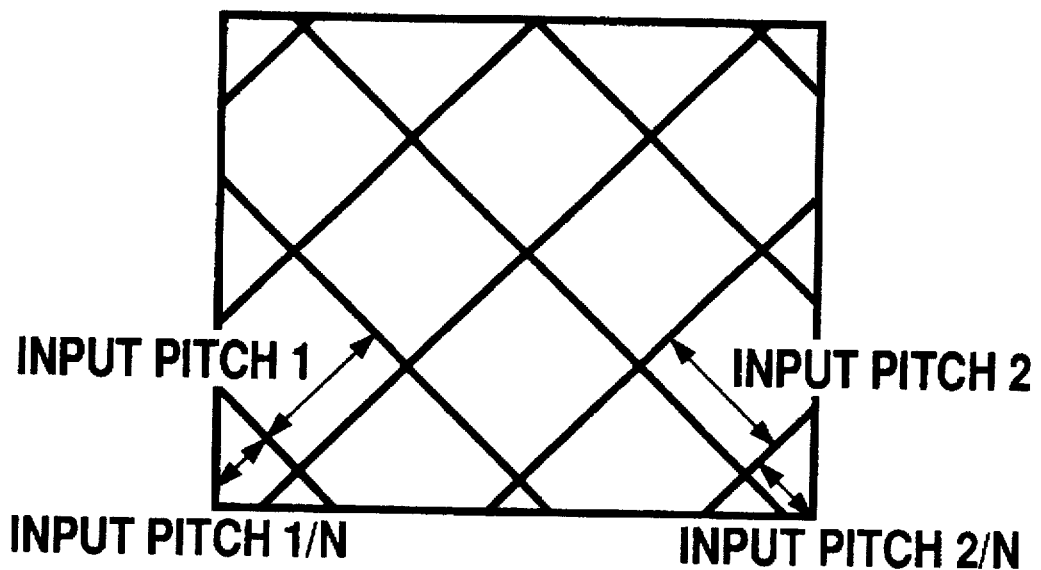
FIG. 34 is a diagram showing the arrangement of supports in an N-th pattern.

By determining this parameter in this way, the first support pattern becomes such as shown in FIG. 33 that supports in a negative direction are arranged at pitch 1 from the left lower end point one by one and supports in a positive direction are arranged at pitch 2 from the right lower end point one by one. A second pattern is such that supports are made closer to left lower end and right lower end points by pitch 1/N or pitch 2/N. For an N-th pattern, as shown in FIG. 34, supports in a negative direction are arranged at pitch 1/N from the left lower end point and supports in a positive direction are arranged at pitch 2/N from the right lower end point.

[Processing of Optimizing Support Arrangement]

The effective arrangement of supports is possible only by arranging supports with the above-described parameters. Then processing for deleting unnecessary portions and adding and creating necessary portions is required. In this embodiment, automatic optimizing processing is prepared. Normally, effective arrangement is possible by this processing. However, when there are special conditions, this processing should be changed. Then, the contents of this processing can be checked and corrected by a designer.

<Automatic Optimizing Processing>

(i) Automatic deletion of unnecessary portions

Figure 35:
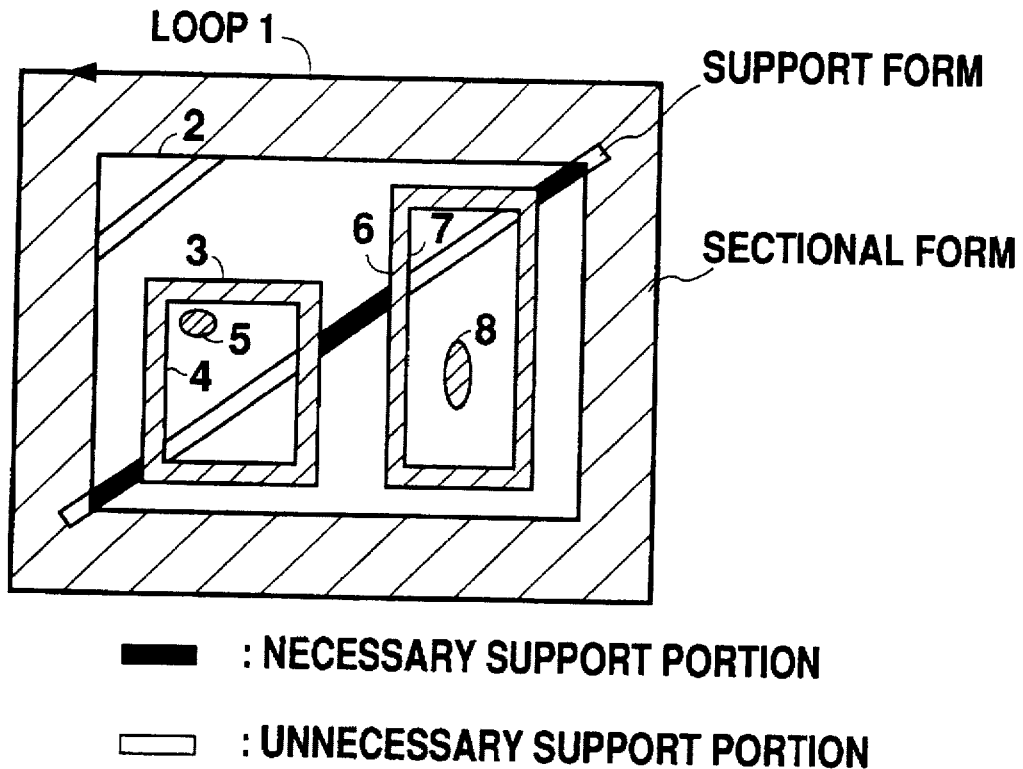
FIG. 35 is a diagram explaining unnecessary portions of a support.

When supports are automatically arranged as described above and there is a space portion inside, supports are always arranged. It is then necessary to delete unnecessary supports. In the case of a mask form as shown in FIG. 35, when a support in a direction of 45° is arranged, unnecessary portions connecting the same forms are produced. Void portions in the figure are unnecessary and solid portions are necessary.

Figure 36:
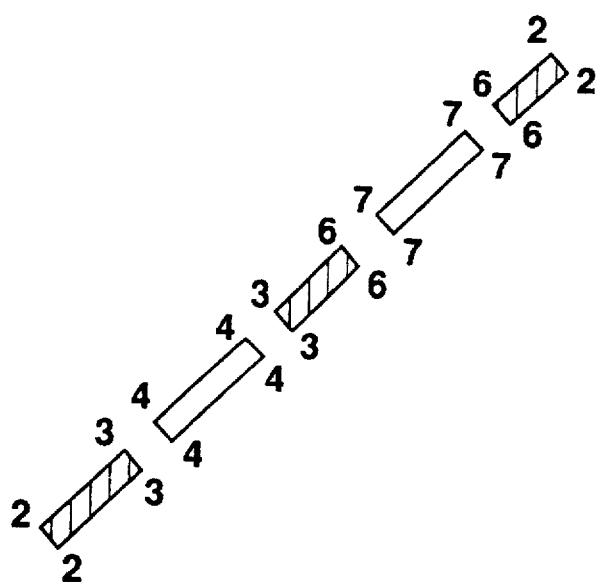
FIG. 36 is a diagram explaining the division of a support.

As shown in FIG. 36, the oblique straight line support form is divided into portions by removing sectional (mask) form portions. To distinguish necessary portions from unnecessary portions, flags indicating which loops (the outline of each sectional form is recognized as a loop) intersect the portion is given to each portion. The loops of each sectional form are numbered sequentially from the left outer side. The outer outline of the form is designated as a counterclockwise loop and the inner outline of the form as a clockwise loop.

Thereby, the upper left support in FIG. 35 has four intersection points with loop 2 and is necessary. Support portions having intersection points with only loop 4 and loop 7 are also unnecessary. In this way, when a support has four intersection points with the same loop, it can be judged that this support is unnecessary. Thus the necessity of a support is judged by checking the values of its flags.

Figure 37:
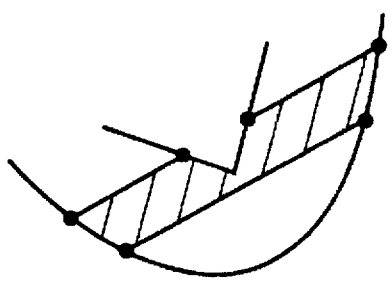
FIG. 37 is a diagram showing an example of an unnecessary support.

If one support has five or more intersection points, as shown in FIG. 37, the support passes over the edge of a form. Since this support is not preferred, it is considered to be unnecessary.

(ii) Automatic support addition

Supports are uniformly arranged at a designated pitch. An island portion which does not meet with a support has no support and it is then necessary to arrange supports for this island portion.

Pairs of counterclockwise and clockwise loops are first checked sequentially and a pair having no intersection points with a support is extracted. A form having no hole has no clockwise loop. When there are a plurality of separate holes in one form, there exists a plurality of clockwise loops for a single counterclockwise loop. These loops are also considered as the above pair.

Figure 38:
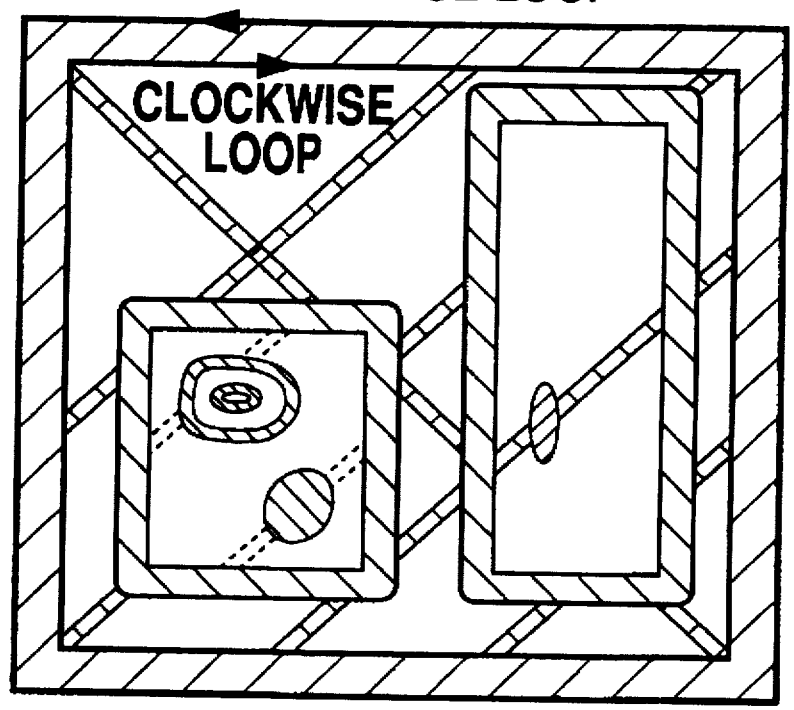
FIG. 38 is a diagram showing locations which need added supports.

By this processing, island portions in a left side portion of a form in FIG. 38 are extracted and it is understood that supports shown by broken lines are necessary for the island portions.

Figure 39:
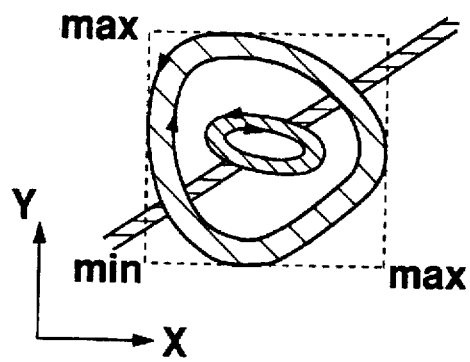
FIG. 39 is a diagram showing how a support is added (part)

By this checking, a min-max box is created for the extracted pair. That is, as shown in FIG. 39, a square surrounding the island portions is created. And a 45° support form which passes over the center of this square is prepared.

The support form portion thus obtained is divided into sub-portions by removing a sectional form portion and a flag indicating which loop intersects a portion is given to the intersection point of the portion.

Figure 40:
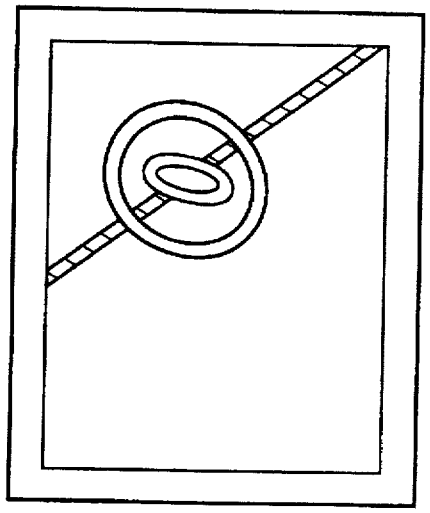
FIG. 40 is a diagram how a support is added (whole)

Thereafter, only portions having flags for counterclockwise loops of the extracted pairs are taken out and designated as necessary support portions. The support portions thus obtained are added to obtain a necessary support form as shown in FIG. 40.

Figure 41:
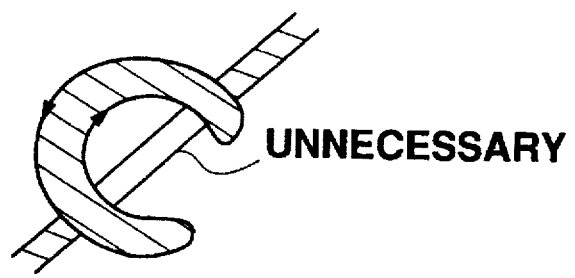
FIG. 41 is a diagram explaining a support for an U-shaped island portion.

When portions having only flags for counterclockwise loops are extracted, an inner support portion for a U-shaped island portion shown in FIG. 41 is also selected. Then, when a support portion only has intersection points with counterclockwise loops, it is not selected.

(iv) Detection of unstable portion and reinforcement of support

Figure 42:
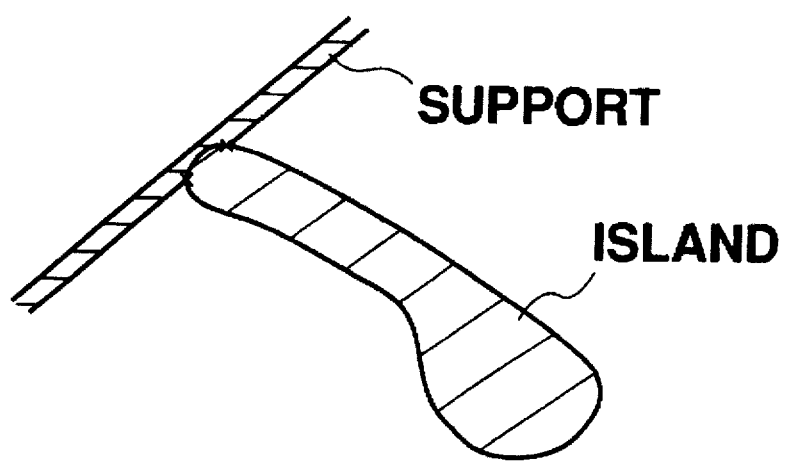
FIG. 42 is a diagram explaining an unstable island portion.

An island portion connected to a support may be unstable according to the connection position of the support. For instance, as shown in FIG. 42, when a support is connected only to one end portion of a slender island portion, the support of this island portion is unstable.

Figure 43:
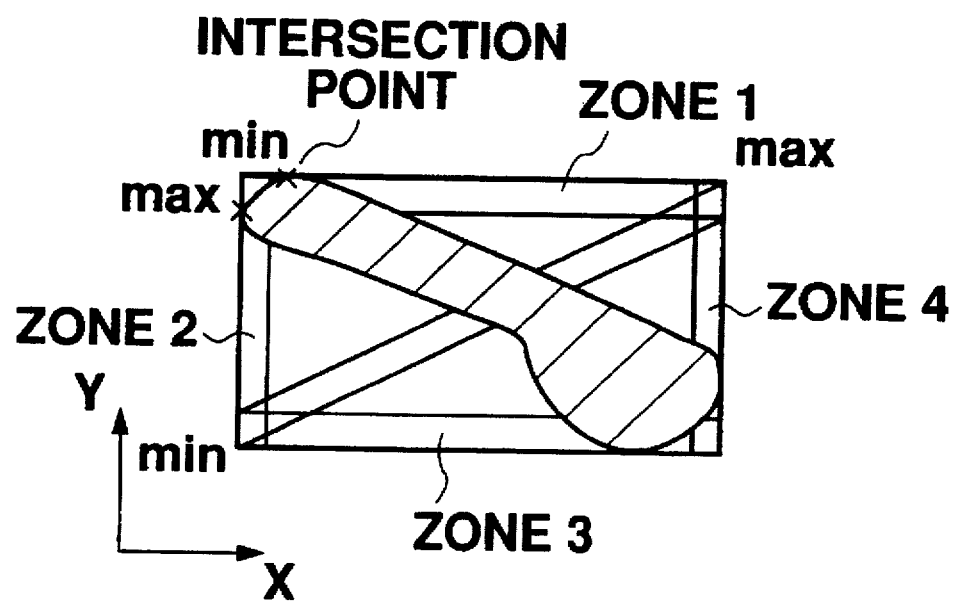
FIG. 43 is a diagram explaining judgement on an unstable island portion.

The support in this case is shown in FIG. 43. As shown in the figure, a min-max box is first created. In this min-max box, a box smaller than that box is formed and four corners formed by these two boxes are made zones 1 to 4.

It is judged which zone each intersection point of the island portion with the support belongs to and, when all the intersection points belong to the same zone, it is judged that the support of the island portion is unstable. When an intersection point belongs to two zones, it is judged that it belongs to one of the two zones.

When it is in this way judged that the island portion is unstable, a support passing over the center of the min-max box is automatically added to the island portion as described above. The processing for an U-shaped island portion is the same as described above.

(v) Checking of overlapping with adjacent pattern at the time of adding and reinforcing support When a support is added and reinforced as described above, a support pattern different from the initial support pattern is obtained. Then, it is necessary to prevent the support of this new support pattern from overlapping with the support of an adjacent layer.

Figure 44:
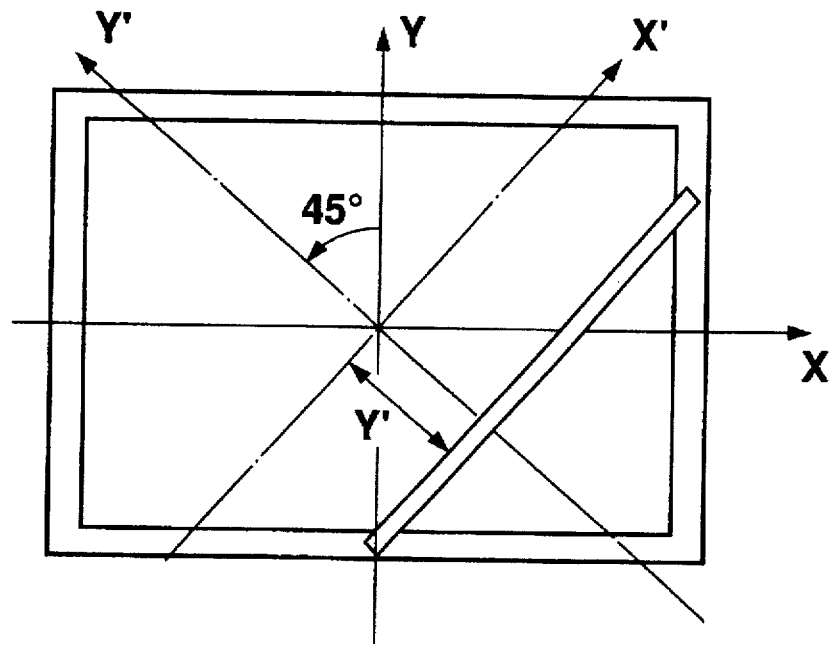
FIG. 44 is a diagram explaining the memorization of the position of a support.

As shown in FIG. 44, the position of the support center line in an X'Y' coordinate system obtained by turning the XY coordinates by 45° are memorized for the past two layers.

When a new support is added, it is checked if it overlaps with the memorized support of an adjacent layer.

Figure 45:
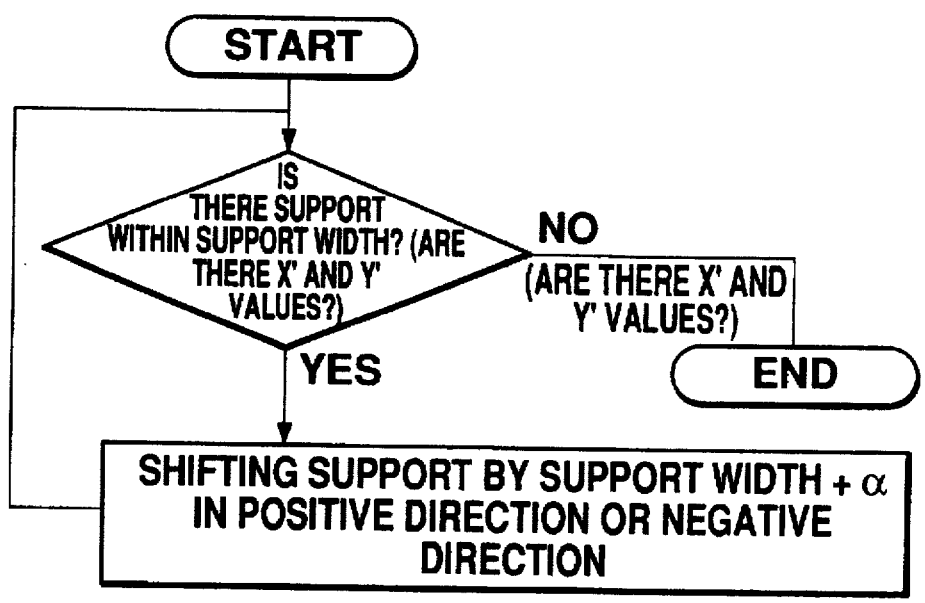
FIG. 45 is a flow chart showing the process of checking overlap between supports of adjacent patterns.

For instance, as shown in FIG. 45, it is judged whether there is a memorized support within the width of a support. When there is, the processing of shifting the position of the support by support width + a (for example, 1 to 2 mm) in a positive or negative direction is repeated until there is no overlap. Thereby, the position of the support overlapped with the support of an adjacent layer can be shifted.

<Checking and Manual Correction Functions of Support Form>

As a result of the above-described automatic optimizing processing, a near optimum support form can be obtained. However, it is advantageous that this optimum support form can be checked and manually corrected if necessary. To this end, this embodiment has checking and manual correction functions.

(i) Checking function of mask form (sequential turning function)

Figure 46:
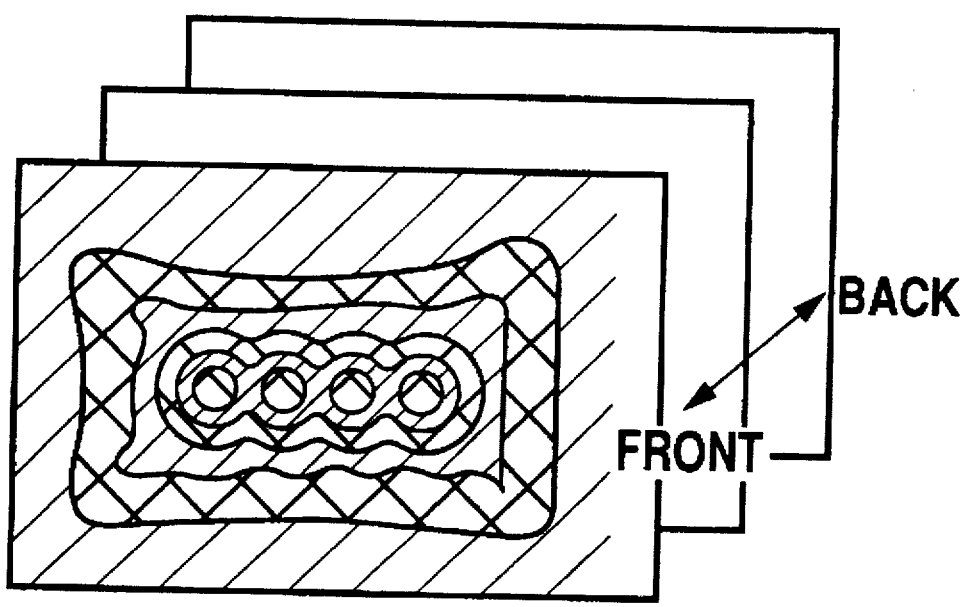
FIG. 46 is a diagram for explaining a sequential turning function for mask forms displayed.

First, the form of each mask can be displayed. As shown in FIG. 46, the forms of masks can be displayed sequentially by forward or backward feeding. Thereby a designer can check masks sequentially. The serial number of a mask currently displayed (the current number of masks so far/total number of masks) is displayed on the screen.

(serial number specification and display functions)

Also, a mask is displayed by specifying its serial number. Thereby, a mask form which needs to be corrected is searched at the time of checking and when it is found, it can be specified and corrected later.

(corrected mask form checking function)

When correction operation is completed by a mask form correction function to be described hereinafter and the correction is made, a mask form is recalculated and displayed after completion. Then, the corrected mask form can be checked.

(ii) Correction function of support form (removal function of support form)

Figure 47:
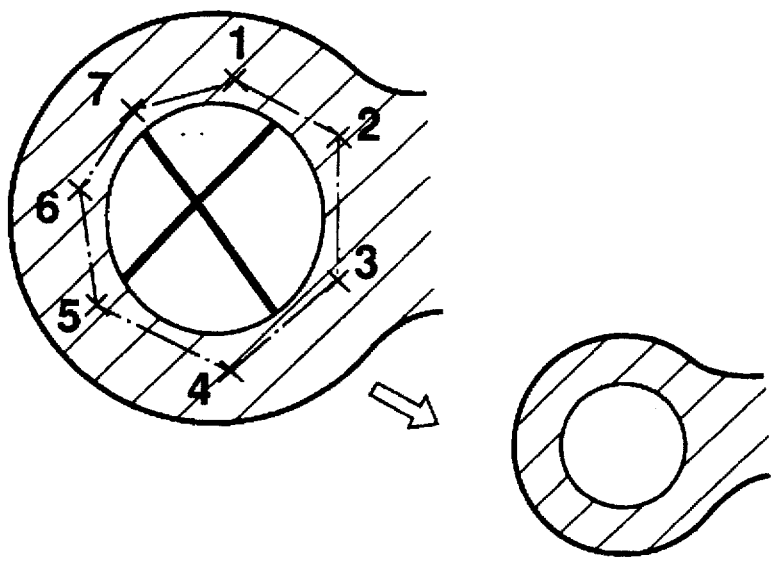
FIG. 47 is a diagram for explaining a support form removal function.

To remove an arbitrary support, the support is enclosed with locating points. That is, as shown in FIG. 47, a predetermined range is enclosed with the locating points and a support present therein is removed. In this case, an almost circular range is specified by seven locating points 1 to 7.

This processing is carried out by sequentially inputting locating points while an arbitrary mask form is displayed as described above. After a predetermined range is specified, a specified support is removed by instructing removal. Supports may be sequentially specified for removal. It is preferred to give these instructions using a mouse.

(support form addition function)

Figure 48:
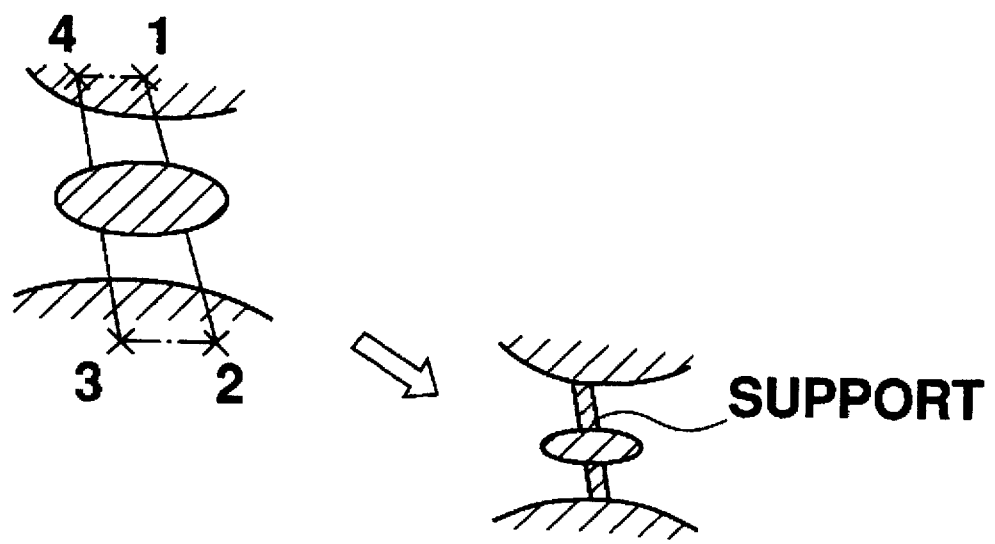
FIG. 48 is a diagram explaining a support form addition function.

This is a function to add a support in an arbitrary space portion. For instance, as shown in FIG. 48, a range enclosed with locating points 1 to 4 is designated as a support by specifying these locating points. In this case, computation for removing a mask form portion is automatically carried out. A support having a designated width may be added by specifying two locating points.

[Entire Configuration of System]

Figure 49:
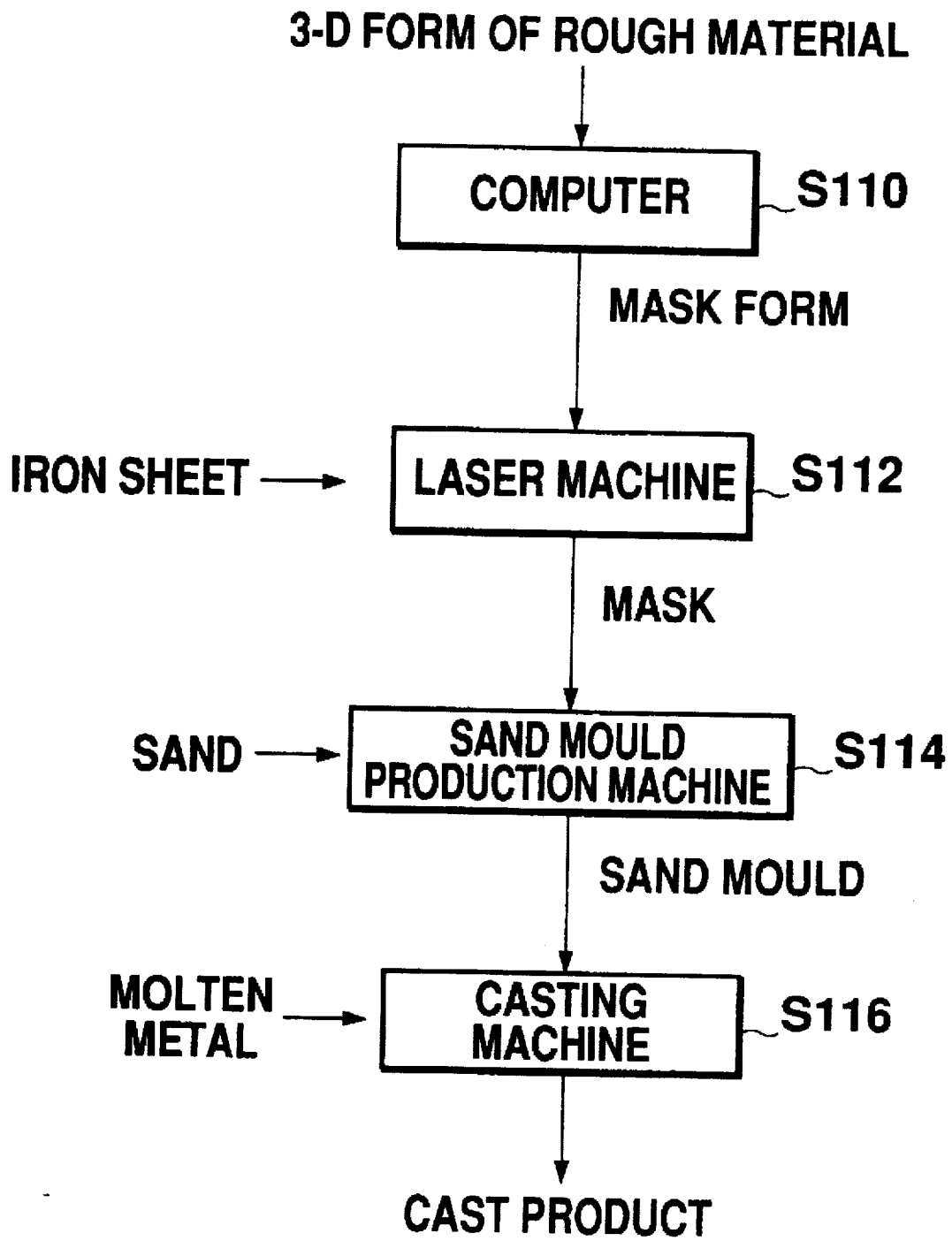
FIG. 49 is a diagram showing the configuration of an entire system.

The entire configuration of a system for producing a cast product is shown in FIG. 49. As shown in the figure, this system consists of a computer 110, a laser machine 112, a sand mould production machine 114 and a casting machine 116.

The computer 110 obtains a required number of mask forms for obtaining the form of a rough material from a 3-D form of the rough material. The laser machine 112 obtains masks by machining iron sheets based on the obtained mask forms. The sand mould production machine 114 obtains a sand mould by repeating the steps of irradiating a laser beam onto a predetermined portion of plastic coated sand using the thus obtained masks, obtaining one layer of a sand mould form and piling up layers of the sand mould form one upon another. The sand mould thus obtained is supplied to the casting machine 116 in which a molten metal is poured into the sand mould. Then, the molten metal is cooled and solidified, the sand mould is removed, and a cast product is obtained.

[Creation of Mask Form]

Figure 50:
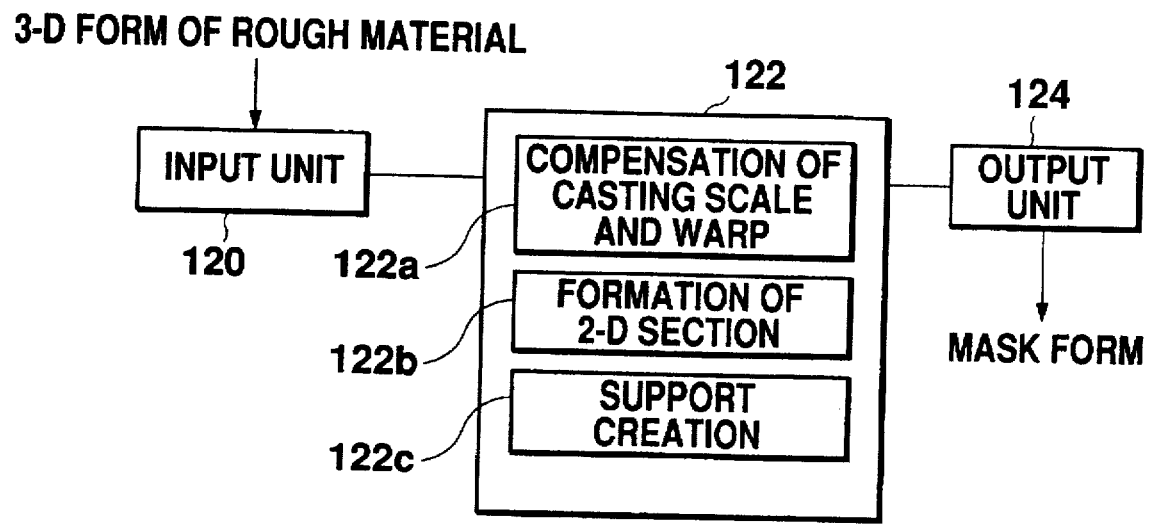
FIG. 50 is a diagram explaining the functions of a computer.

The above computer 110 is used to generate mask forms and, as shown in the function block diagram of FIG. 50, consists of an input unit 20, a processing unit 22 and an output unit 24. The processing unit 22 has a casting scale/warp compensating unit 22a, a 2-D section forming unit 22b and a support creation unit 22c.

The input unit 20 receives 3-D form data of the rough material and accepts the input of specifications of the above-described parameters and manual operation. The output unit 24 outputs the thus obtained mask forms as data. The output unit 24 may include a display unit and a printer.

The processing unit 22 performs the processings of compensating for a casting scale and a warp, forming 2-D sectional data and creating supports as described above.

[Mask Machining]

Figure 51:
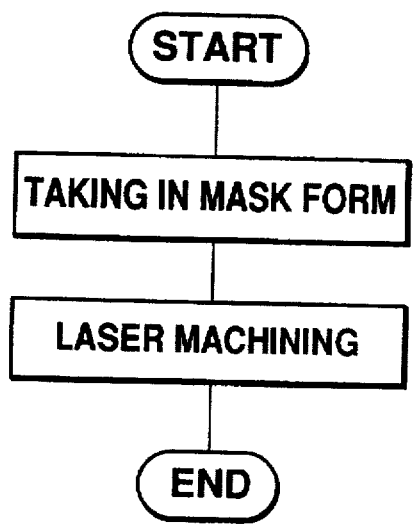
FIG. 51 is a diagram showing the processing of laser machining.

As shown in FIG. 51, the laser machine 112 first takes in data on mask forms and machines masks one by one based on the data. That is, the machine irradiates a laser beam onto an outline portion of a mask form on an iron sheet and cuts the iron sheet. It sequentially takes in data on each mask and machines each iron sheet to prepare one set of masks (for one sand mould).

[Production of Sand Mould and Casting]

The sand mould production machine 114 consists of a sand laminating unit for laminating individual sand layers, a mask setting unit for setting masks on the sand laminating unit one after another, and a laser irradiating unit for irradiating a laser beam onto each sand layer.

Figure 52:
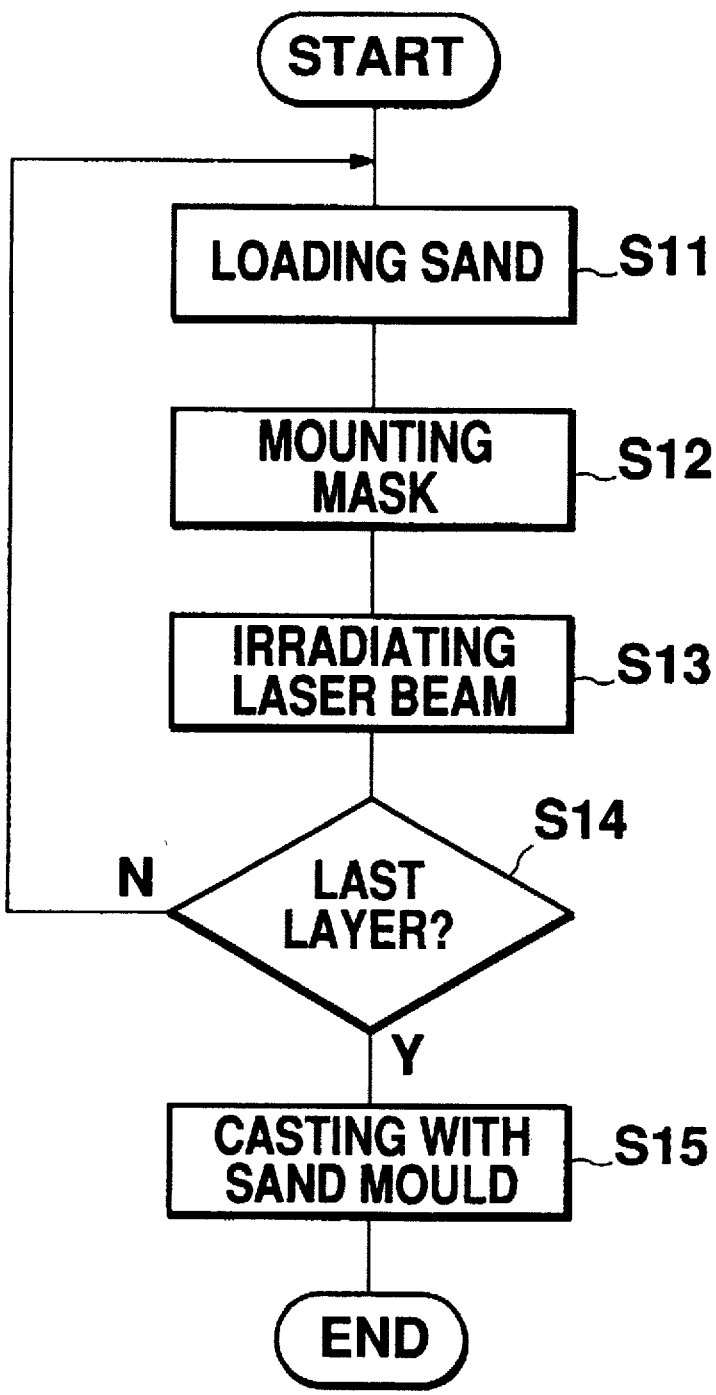
FIG. 52 is a diagram explaining the steps from the production of a sand mould to casting.

As shown in FIG. 52, the sand of one layer is first loaded into the sand laminating unit (S11). This sand is plastic coated sand having a predetermined diameter which is coated with a plastic such as a thermosetting plastic therearound. Thereafter, a mask is set above the sand (S12). When the mask has been set, a laser beam is irradiated from above the mask (S13). Thereby, the sand below the opening of the mask is exposed to the laser beam and an exposed portion of the sand is solidified (integrated).

Thereafter, it is judged whether this mask is the last (the next mask is present) (S14). When the next mask is present, the routine returns to S11 to proceed to the processing of the next sand layer. When the mask is the last in S14, the processing is ended. In this way, a sand mould is manufactured.

Finally, the sand mould thus produced is used to produce a casting (S15).

What is claimed is:

1. A method for forming a sand mould as a 3-dimensional form comprising the steps of:
    (a) forming a sand layer by accumulating sand coated with a thermosetting resin in the form of a thin layer;
    (b) arranging a mask having an opening in a predetermined portion above the formed sand layer;
    (c) heating a portion of the sand layer located below the opening through the arranged mask to solidify the portion;
    (d) forming one layer of a sectional form of the sand mould; and
    (e) piling up sectional forms to form a sand mould as a 3-dimensional form by repeating steps (a)–(d) by irradiating a diffused laser beam onto the sand layer through the mask to heat an exposed portion of the sand layer.

2. The method for forming a sand mould according to claim 1, wherein, when an island corresponding to a core is present in the mask, a mask in which this island is supported by supports extending from other mask portions is used and the positions of the supports are made different between masks for adjacent sand layers.

3. The method for forming a sand mould according to claim 1, wherein a heat source having a relatively large area which is divided into multiple heat source elements is arranged above the mask to heat an exposed portion of the sand layer.

4. The method for forming a sand mould according to claim 3, wherein the divided heat source elements can be turned on and off independently for respective divided blocks of the area of the sand layer and only heat source elements located above an exposed portion of a heat insulating mask are turned on in the heating step.

5. The method for forming a sand mould according to claim 1, wherein the formation of the sand mould is carried out in a plurality of stations to form a plurality of sand moulds in parallel and the mask is movable among the plurality of stations and shared by the plurality of stations.

6. The method for forming a sand mould according to claim 1, wherein a first sand layer is formed on and adhered to a pedestal for supporting a sand layer stably at the time of forming the sand layer.

7. The method for forming a sand mould according to claim 1, wherein at least two different types of sands which differ in grain diameter are used as the sand used in the sand layer.

8. The method for forming a sand mould according to claim 7, wherein, in the step of forming a sand layer, the sand having a relatively large grain diameter is first sprinkled and then the sand having a relatively small grain diameter is sprinkled to form one sand layer.

9. The method for forming a sand mould according to claim 1, wherein, in the step of forming a sand layer, the sand is compressed by vibration generated by an oscillator to form a sand layer.

10. The method for forming a sand mould according to claim 1, wherein, in the step of forming a sand layer, the sand layer is formed to a thickness 1 to 10% larger than the thickness of a required sand layer and then compressed by a plate from above.

11. A method for forming a sand mould as a 3-dimensional form comprising the steps of:
    (a) forming a sand layer by accumulating sand coated with a thermosetting resin in the form of a thin layer;
    (b) arranging a mask having an opening in a predetermined portion above the formed sand layer;
    (c) heating a portion of the sand layer located below the opening through the arranged mask to solidify the portion;
    (d) forming one layer of a sectional form of the sand mould; and
    (e) piling up sectional forms to form a sand mould as a 3-dimensional form by repeating steps (a)–(d);
wherein the mask is manufactured based on a mask form obtained after the arrangement of supports by the following steps:
    creating a mask for based on a 2-dimensional sectional form of a casting form; and
    automatically arranging supports at predetermined intervals in the space; portion surrounding the detected island portion based on parallel lines arranged at predetermined intervals.

12. The method for forming a sand mould according to claim 11, wherein, in the step of automatically arranging supports, the positions of the supports are made different between masks used for adjacent layers.

13. The method for forming a sand mould according to claim 11, wherein, in the step of automatically arranging supports, the positions of the supports are made different among masks used for at least three adjacent layers.

14. The method for forming a sand mould according to claim 11, wherein, in the step of automatically arranging supports, the island portion is judged by a closed outline and a support connecting the same outline is removed as unnecessary.

15. The method for forming a sand mould according to claim 11, wherein the mask is manufactured by machining a sheet metal by a laser based on a mask form in which supports have been arranged.

16. A method for forming a sand mould as a 3-dimensional form comprising the steps of:
    (a) forming a sand layer by accumulating sand coated with a thermosetting resin in the form of a thin layer;
    (b) arranging a mask having an opening in a predetermined portion above the formed sand layer;
    (c) heating a portion of the sand layer located below the opening through the arranged mask to solidify the portion;
    (d) forming one layer of a sectional form of the sand mould; and
    (e) piling up sectional forms to form a sand mould as a 3-dimensional form by repeating steps (a)–(d);
wherein the mask is manufactured based on a mask form obtained after the arrangement of supports by the following steps:
    creating a mask form based on a 2-dimensional sectional form of a casting form;
    detecting an island portion surrounded by a space portion from the thus created mask form; and
    automatically arranging supports in the space portion surrounding the detected island portion based on a lattice of supports arranged at predetermined intervals.

17. A method for forming a sand mould as a 3-dimensional form comprising the steps of:
    (a) forming a sand layer by accumulating sand coated with a thermosetting resin in the form of a thin layer;
    (b) arranging a mask having an opening in a predetermined portion above the formed sand layer;
    (c) heating a portion of the sand layer located below the opening through the arranged mask to solidify the portion;
    (d) forming one layer of a sectional form of the sand mould; and
    (e) piling up sectional forms to form a sand mould as a 3-dimensional form by repeating (a)–(d);
wherein the mask is manufactured based on a mask form obtained after the arrangement of supports has been changed by the following steps:
    creating a mask for based on a 2-dimensional sectional form of a casting form;
    detecting an island portion surrounded by a space portion from the thus created mask form;
    automatically determining the arrangement positions of supports for supporting the island portion based on predetermined rules; and
    changing the position of an automatically arranged support according to a connection state between the island portion and the support.

18. The method for forming a sand mould according to claim 17, wherein the position of the support is changed based on the stability of the island portion which is judged from the center position of the island portion and the connection position of the support with the island portion.

19. A method for forming sand mould for producing a casting using the sand mould comprising the steps of:
    (a) forming a sand layer by accumulating sand coated with a thermosetting resin in the form of a thin layer;
    (b) arranging a mask having an opening in a predetermined portion above the formed sand layer;
    (c) heating a portion of the sand layer located below the opening through the arranged mask to solidify the portion by irradiating a diffused laser beam onto the sand layer through the mask to heat an exposed portion of the sand layer;
    (d) thereby forming one layer of a sectional form of the sand mould;
    (e) piling up sectional forms to form a sand mould as a 3-dimensional form by repeating steps (a)–(d); and
    producing a casting using the thus obtained sand mould.

20. An apparatus for forming a sand mould as a 3-dimensional form comprising:
    a sand layer forming device for forming a sand layer by accumulating sand coated with a thermosetting resin in the form of a thin layer;
    a mask having an opening in a predetermined portion and changeably arranged above the formed sand layer;
    a mask changer for changing the mask arranged above the formed sand layer; and
    A diffused laser irradiating unit above the mask for irradiating a laser beam onto a portion of the sand layer located below the opening through the arranged mask to solidify the portion.

* * * * *